United States Patent
Xiao et al.

(10) Patent No.: US 11,640,235 B2
(45) Date of Patent: May 2, 2023

(54) ADDITIONAL OBJECT DISPLAY METHOD AND APPARATUS, COMPUTER DEVICE, AND STORAGE MEDIUM

(71) Applicant: Tencent Technology (Shenzhen) Company Limited, Shenzhen (CN)

(72) Inventors: Xianmin Xiao, Shenzhen (CN); Zhong Bao Zhang, Shenzhen (CN); Hui Jiang, Shenzhen (CN); Wen Tao Wang, Shenzhen (CN); Peng Xiao, Shenzhen (CN); Xiong Zhi Li, Shenzhen (CN); Yuanhao Zhang, Shenzhen (CN); Feng Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/930,124

(22) Filed: May 12, 2020

(65) Prior Publication Data

US 2020/0272309 A1  Aug. 27, 2020

Related U.S. Application Data

(63) Continuation of application No. PCT/CN2019/070616, filed on Jan. 7, 2019.

(30) Foreign Application Priority Data

Jan. 18, 2018  (CN) .......................... 201810050497.6

(51) Int. Cl.
*G06F 3/04847* (2022.01)
*G06F 3/04845* (2022.01)
*G11B 27/34* (2006.01)

(52) U.S. Cl.
CPC ...... *G06F 3/04847* (2013.01); *G06F 3/04845* (2013.01); *G11B 27/34* (2013.01)

(58) Field of Classification Search
CPC ............. G06F 3/04847; G06F 3/04845; G06F 3/0484; G11B 27/34; G11B 27/36; G06K 9/00711

(Continued)

(56) References Cited

U.S. PATENT DOCUMENTS 6,144,972 A * 11/2000 Abe ...................... G06F 16/748
                                                                345/475
2008/0046956 A1* 2/2008 Kulas .................. H04N 21/4325
                                                                725/112

(Continued)

FOREIGN PATENT DOCUMENTS

CN   1777916 A    5/2006
CN   104346095 A  2/2015

(Continued)

OTHER PUBLICATIONS

Microsoft, "Screen Captures for Dragging Anchoring Control or a Picture in Microsoft Word 2016", release date: Sep. 22, 2015 (Year: 2015).*

(Continued)

*Primary Examiner* — Reza Nabi
*Assistant Examiner* — Hwei-Min Lu
(74) *Attorney, Agent, or Firm* — Crowell & Moring LLP

(57) ABSTRACT

This application provides an additional object display method, an additional object display apparatus, and a computer device, and relates to the field of computer application technologies. The method includes: displaying a trigger control in a video playback interface; pausing playback of a video in response to an activation operation on the trigger control, and displaying a reference picture frame; obtaining (Continued)

a target object in the reference picture frame in response to a drag operation on the trigger control; and displaying, corresponding to the target object, an additional object corresponding to the trigger control in a picture frame of the video during playback of the video, so that an additional object matches a video playback picture during playback of the video.

17 Claims, 15 Drawing Sheets

(58) Field of Classification Search
USPC ........................................................ 715/720
See application file for complete search history.

(56) References Cited

U.S. PATENT DOCUMENTS

| | | | |
|---|---|---|---|
| 2009/0094520 A1* | 4/2009 | Kulas | G06F 16/7867 707/999.102 |
| 2009/0327856 A1* | 12/2009 | Mouilleseaux | G06F 16/70 715/230 |
| 2010/0281386 A1* | 11/2010 | Lyons | G11B 27/034 715/731 |
| 2011/0261258 A1* | 10/2011 | Ramachandran | H04N 9/8715 348/E5.099 |
| 2012/0210230 A1* | 8/2012 | Matsuda | G06F 3/04847 715/723 |
| 2013/0163958 A1* | 6/2013 | Totoki | H04N 5/91 386/E5.003 |
| 2014/0344853 A1* | 11/2014 | Maruyama | H04N 21/8583 725/32 |
| 2015/0277686 A1* | 10/2015 | LaForge | G06Q 50/01 715/723 |
| 2016/0196052 A1* | 7/2016 | Franklin | G06F 3/0481 715/765 |
| 2016/0309239 A1* | 10/2016 | Maruyama | H04N 21/23418 |
| 2017/0018289 A1 | 1/2017 | Morgenstern | |
| 2019/0096439 A1* | 3/2019 | Brouwer | H04N 21/44008 |
| 2019/0114047 A1* | 4/2019 | Kikin-Gil | G06T 11/60 |
| 2019/0114057 A1* | 4/2019 | Kerr | G06F 3/04845 |
| 2019/0246165 A1* | 8/2019 | Brouwer | H04N 21/4728 |

FOREIGN PATENT DOCUMENTS

| | | |
|---|---|---|
| CN | 104394313 A | 3/2015 |
| CN | 104469179 A | 3/2015 |
| CN | 105955641 A | 9/2016 |
| CN | 106385591 A | 2/2017 |
| CN | 106611412 A | 5/2017 |
| CN | 106683120 A | 5/2017 |
| CN | 107274431 A | 10/2017 |
| JP | 11306354 A | 11/1999 |
| JP | 2013-115691 A | 6/2013 |
| JP | 2013-115692 A | 6/2013 |
| JP | 5671671 | 2/2015 |
| JP | 2017-169222 A | 9/2017 |
| WO | WO 2012/144225 | 7/2014 |
| WO | W02017077751 A1 | 5/2017 |

OTHER PUBLICATIONS

Toklu et al., "Semi-automatic video object segmentation in the presence of occlusion", IEEE Transactions on Circuits and Systems for Video Technology, vol. 10, No. 4, pp. 624-629, Jun. 2000. (Year: 2000).*
Nebehay et al., "Clustering of static-adaptive correspondences for deformable object tracking", 2015 IEEE Conference on Computer Vision and Pattern Recognition, published on Jun. 1, 2015, pp. 2784-2791. (Year: 2015).*
Microsoft, "Screen Captures for Dragging Anchoring Control of a Picture in Microsoft Word 2016", release date: Sep. 22, 2015 (Year: 2015).*
Aaron Martinez, "Snapchat Update v9.28.0.0—How to Use 3D Stickers on Snapchat (Moving Emojis)", posted on Apr. 21, 2016 at www.youtube.com/watch?v=pXrTy8NOnhQ. (Year: 2016).*
Chinese Office Action for Chinese Patent Application 2018100504976 dated Mar. 24, 2021, including an English Concise Explanation (11 pages).
International Search Report and Written Opinion for PCT/CN2019/070616 dated Apr. 1, 2019 including translation (14 pages).
Indian Examination Report for Application No. 202037034525 dated Nov. 17, 2021 including translation (6 pages).
Mediocre Tutorials and Reviews: "Tutorial | How to Create Moving Emojis on Snapchat", Youtube, Feb. 10, 2017, retrieved from internet: https://www.youtube.com/watch?v=Lvn53BDFbRs.
Anonymous: "How to Pin Stickers to Snapchat Videos: 8 Steps (with Pictures)", Jun. 15, 2017, Retrieved from internet: https://web.archive.org/web/2170615160734/http://www.wikihow.com/Pin-Stickers-to-Snapchat-videos.
Notice of Reasons for Refusal for JP Application No. 2020-539223 dated Oct. 27, 2021 including translation (10 pages).
Extended Search Report of European Application 19740905.5, dated Jun. 25, 2021, 8 pages.
Office Action of Chinese Application CN201810050497.6 dated Sep. 28, 2021, 8 pages, including concise English explanation of relevance of Chinese office action.

* cited by examiner

Press on a nail, and the nail can be dragged

There is a connecting line when the nail is dragged

Click another area to start playback

The nail is displayed with a flashing animation after being released

ADDITIONAL OBJECT DISPLAY METHOD AND APPARATUS, COMPUTER DEVICE, AND STORAGE MEDIUM

RELATED APPLICATION

This application is a continuation of PCT Application No. PCT/CN2019/070616, filed Jan. 7, 2019, which claims priority to Chinese Patent Application No. 201810050497.6, entitled "ADDITIONAL OBJECT DISPLAY METHOD AND APPARATUS, AND COMPUTER DEVICE" and filed with the Chinese Patent Office on Thursday, Jan. 18, 2018. The contents of each of the applications are incorporated by reference in their entirety.

FIELD OF THE TECHNOLOGY

This application relates to the field of computer application technologies, and in particular, to an additional object display method, an additional object display apparatus, a computer device, and a storage medium.

BACKGROUND OF THE DISCLOSURE

With the continuous development of video processing technology, many application programs provide a function of adding an additional object to a video to improve a playback effect of the video.

In the related art, when a user needs to add an additional object to a video to display the additional object, the user may specify a target position and a to-be-added additional object in a video playback interface, and a terminal continuously displays the additional object at the target position during subsequent video playback. However, by using the solution in the related art, after the user specifies the target position, a display position of the additional object in the video is fixed. As a result, the additional object does not match a video playback picture during subsequent video playback.

SUMMARY

Embodiments of this application provide an additional object display method, an additional object display apparatus, a computer device, and a storage medium, so as to make an additional object match a video playback picture in a video. The technical solution is as follows.

According to one aspect, an additional object display method is provided. The method is performed by a terminal, and includes: displaying a trigger control in a video playback interface, the video playback interface being used for playing a video;

pausing playback of the video in response to an activation operation on the trigger control, and displaying a reference picture frame in the video playback interface, the reference picture frame being a picture frame corresponding to a pause time point in the video; obtaining a target object in response to a drag operation on the trigger control, the target object being a display object corresponding to an end position of the drag operation in the reference picture frame; and displaying, corresponding to the target object, an additional object corresponding to the trigger control in a picture frame of the video during playback of the video.

According to one aspect, an additional object display apparatus is provided. The apparatus is used in a terminal, and includes: a control display module, configured to display a trigger control in a video playback interface, the video playback interface being used for playing a video;

a pause module, configured to pause playback of the video in response to an activation operation on the trigger control, and display a reference picture frame in the video playback interface, the reference picture frame being a picture frame corresponding to a pause time point in the video;

an object obtaining module, configured to obtain a target object in response to a drag operation on the trigger control, the target object being a display object corresponding to an end position of the drag operation in the reference picture frame; and an object display module, configured to display, corresponding to the target object, an additional object corresponding to the trigger control in a picture frame of the video during playback of the video.

Optionally, the apparatus further includes: a tracking module, configured to: before the object display module displays, corresponding to the target object, the additional object corresponding to the trigger control in the video, track the target object in each picture frame of the video, and obtain first display information, the first display information being used for indicating at least one of a display position, a display size, and a display posture of the target object in each picture frame; and an information generation module, configured to generate second display information according to the first display information, the second display information being used for indicating at least one of a display position, a display size, and a display posture of the additional object in each picture frame;

where the object display module is specifically configured to display the additional object according to the second display information in each picture frame during playback of the video.

Optionally, the first display information includes pixel coordinates of a target point in the target object in each picture frame, and the target point is a position point corresponding to the end position of the drag operation in the target object. The information generation module is specifically configured to obtain pixel coordinates of the additional object in each picture frame according to the pixel coordinates of the target point in the target object in each picture frame and relative position information between the additional object and the target point; and generate the second display information including the pixel coordinates of the additional object in each picture frame.

Optionally, the apparatus further includes: a preview picture display module, configured to display a preview picture of the additional object in the video playback interface;

a display position obtaining module, configured to obtain a display position of the preview picture in the reference picture frame; and a relative position obtaining module, configured to obtain the relative position information between the additional object and the target point according to the display position of the preview picture in the reference picture frame and the corresponding end position of the drag operation in the reference picture frame.

Optionally, the apparatus further includes: a movement module, configured to move a position of the preview picture of the additional object in the video playback interface in response to a drag operation on the preview picture of the additional object.

Optionally, the first display information includes the display size of the target object in each picture frame. The information generation module is specifically configured to calculate a zoom ratio of the additional object in each picture frame according to the display size of the target object in each picture frame and an original size of the target object, the original size of the target object being a display size of the target object in the reference picture frame; obtain, according to an original size of the additional object and the zoom ratio, the display size of the additional object in each picture frame; and generate the second display information including the display size of the additional object in each picture frame.

Optionally, the first display information includes the display position and the display posture of the target object in each picture frame. The information generation module is specifically configured to obtain the display position and the display posture of the additional object in each picture frame according to the display position and the display posture of the target object in each picture frame and the relative position information between the additional object and the target point; and generate the second display information including the display position and the display posture of the additional object in each picture frame.

Optionally, the tracking module is specifically configured to track, starting from the reference picture frame, the target object frame by frame in each picture frame in a chronological order and/or reverse order of playback time, and obtain the first display information.

Optionally, the tracking module is specifically configured to track the target object in each picture frame of the video by using a clustering of static-adaptive correspondences for deformable object tracking (CMT) algorithm, and obtain the first display information.

Optionally, the apparatus further includes: a switch control display module, configured to display, corresponding to the trigger control, a switch control in the video playback interface;

a selection interface display module, configured to display an additional object selection interface in response to an activation operation on the switch control, the additional object selection interface including at least two candidate objects; and an additional object obtaining module, configured to obtain, in response to a selection operation in the additional object selection interface, a candidate object corresponding to the selection operation as a new additional object corresponding to the trigger control.

Optionally, the additional object is a static display object or a dynamic display object.

According to one aspect, a computer device is provided, the computer device including a processor and a memory, the memory storing at least one instruction, at least one program, and a code set or an instruction set, and the at least one instruction, the at least one program, the code set or the instruction set being loaded and executed by the processor to implement the additional object display method according to any one of the possible implementations described above.

According to one aspect, a computer-readable storage medium is provided. The storage medium stores at least one instruction, at least one program, and a code set or an instruction set, the at least one instruction, the at least one program, the code set or the instruction set being loaded and executed by a processor to implement the additional object display method.

The technical solutions provided in this application may include the following beneficial effects:

a trigger control is displayed in a video playback interface in advance; playback of a video may be paused when a user's activation operation on the trigger control is detected; when a drag operation on the trigger control is received, a display object corresponding to an end position of the drag operation is determined as a target object; and an additional object is displayed corresponding to the same target object in each picture frame during subsequent playback, thereby achieving the effect of making an additional object match a video playback picture during playback of the video.

It is to be understood that the foregoing general descriptions and the following detailed descriptions are merely exemplary and explanatory, and this application is not limited thereto.

BRIEF DESCRIPTION OF THE DRAWINGS

The accompanying drawings herein form a part of the specification, illustrate embodiments consistent with this application and are used to explain the principles of this application together with the specification.

DESCRIPTION OF EMBODIMENTS

Figure 1:
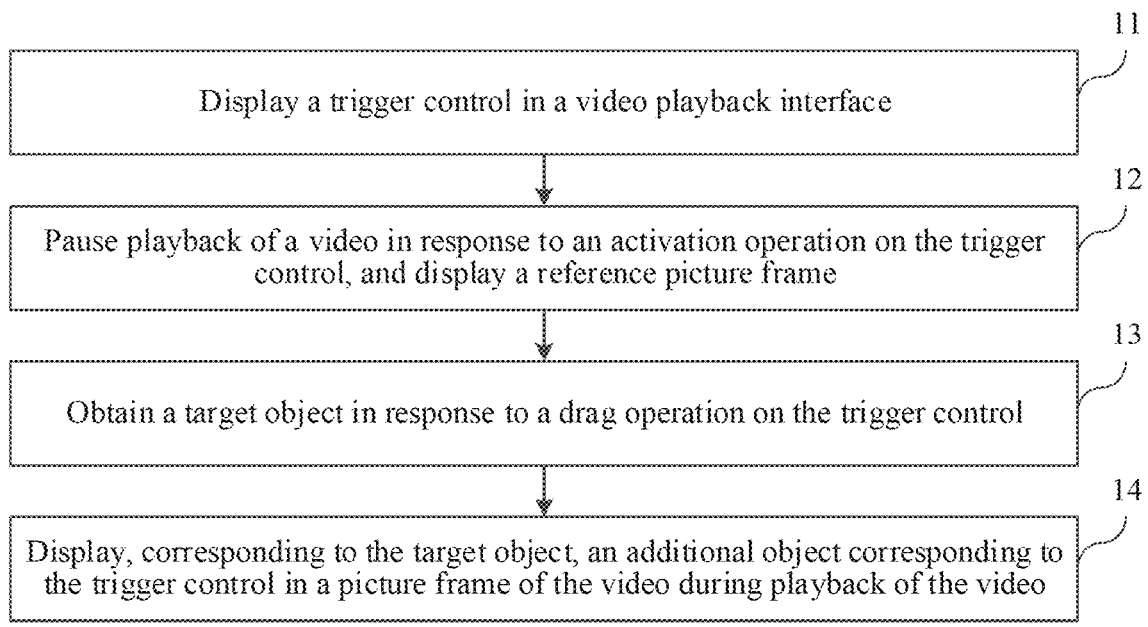
FIG. 1 is a basic flowchart of displaying an additional object according to an exemplary embodiment of this application.

Exemplary embodiments are described in detail herein, and the embodiments are illustratively shown in the accompanying drawings. When the following descriptions relate to the accompanying drawings, unless otherwise indicated, same numbers in different accompanying drawings represent same or similar elements. The implementations described in the following exemplary embodiments do not represent all implementations consistent with this application. On the contrary, the implementations are merely examples of apparatuses and methods that are described in detail in the appended claims and that are consistent with some aspects of this application.

The solution provided in this application may be applied to a terminal with a certain computing capability and a video playback function. For example, the terminal may be a mobile terminal such as a smartphone, a tablet computer, or an ebook reader. Alternatively, the terminal may be a personal computer device such as a desktop computer, a notebook computer, or the like.

For ease of understanding the solutions provided in this application, several terms in this application are explained below.

1. Additional object. In the embodiments of this application, the additional object is also referred to as a sticker or a video sticker, which is a text or an image element that is added to an upper layer of an existing video for display.

Additional objects include dynamic objects (also referred to as dynamic stickers) and static objects (also referred to as static stickers). The dynamic object is an object having an animation effect, similar to an animated expression. The static object is an object without an animation effect, similar to a static picture.

The additional object may be a transparent, translucent, or non-transparent display object.

2. Picture frame. The picture frame in this application refers to image data that is played according to a timestamp during playback of the video.

3. Object tracking. The object tracking in this application means that in a picture frame sequence of a video, for a specified display object in all the display objects included in a picture frame, the specified display object is found in other picture frames in addition to this picture frame in the picture frame sequence of the video, and information such as the position, size, and posture (usually a rotation angle) of the specified display object in the other picture frames are obtained.

The display object in a picture frame refers to a visual element in the picture frame, for example, a character, a face, a table, a stone, a house, a cloud, or a sky in a picture frame may be the display object in the picture frame.

4. Clustering of static-adaptive correspondences for deformable object tracking algorithm. The clustering of static-adaptive correspondences for deformable object tracking (CMT) algorithm is an object tracking algorithm that can be applied to track a display object (such as a character or an object) in a video scene. The CMT algorithm is a feature-based tracking method that uses the classic optical flow method as part of the algorithm.

5. Dictionary. The dictionary in this application is a collection for storing data with mapping relationships, and may be regarded as a container for storing key-value pairs, where a key-value pair may be considered as an entry. A key is used in the dictionary for accessing elements, and the key cannot be repeated; a value needs to be an object, and key-value pairs may be stored in the dictionary in an ordered or unordered manner.

FIG. 1 is a basic flowchart of an additional object display method according to an exemplary embodiment of this application. The process may be implemented by a terminal. As shown in FIG. 1, the process may include the following steps:

Step 11. Display a trigger control in a video playback interface, the video playback interface being used for playing a video.

In the embodiments of this application, when playing a video, the terminal may display a trigger control in a video playback interface. The trigger control is suspended on an upper layer of the video playback interface and can accept user operations, such as cursor operations or touch operations.

Figure 2:
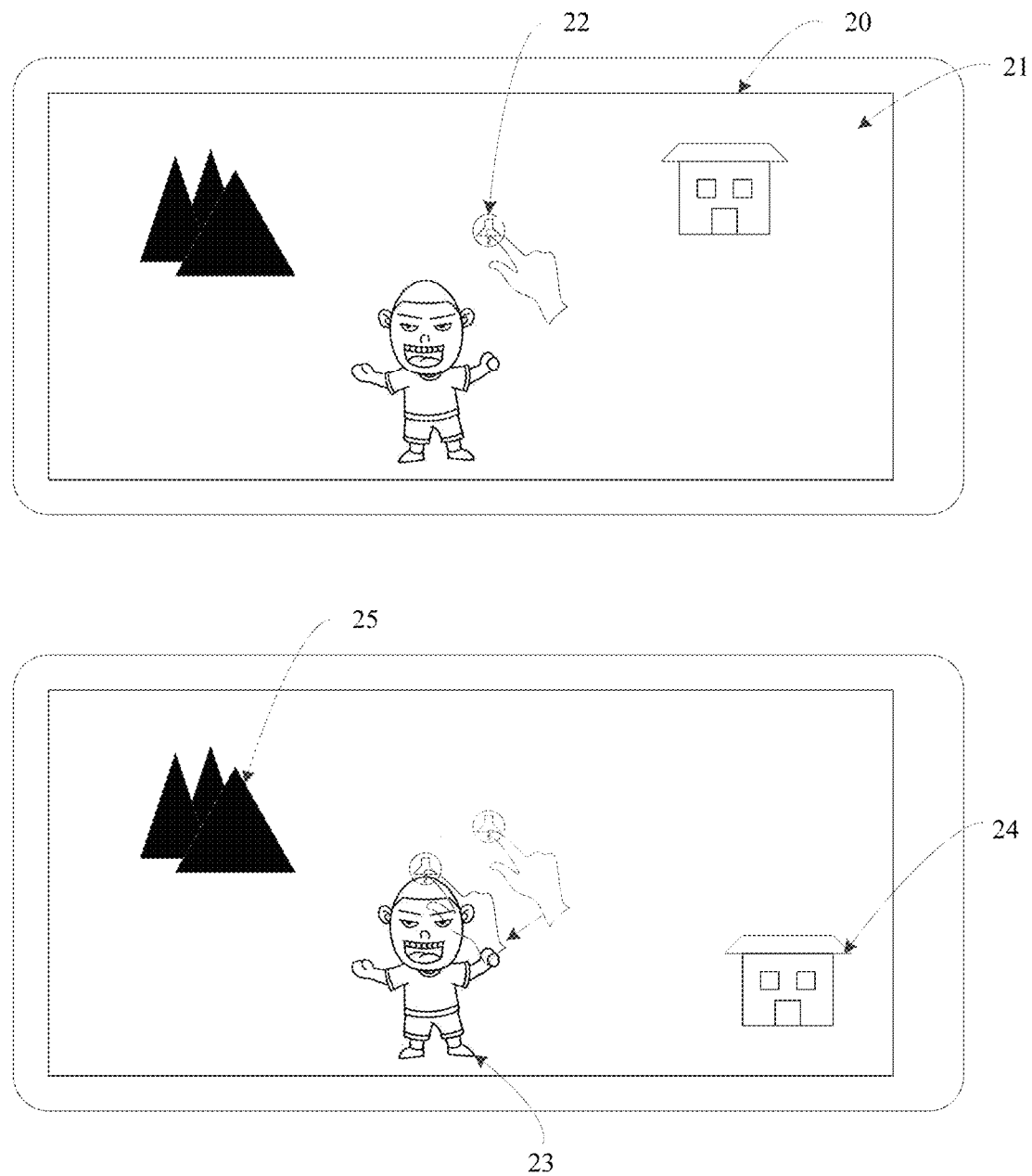
FIG. 2 is a display interface diagram of a trigger control in the embodiment of FIG. 1.

For example, FIG. 2 is a display interface diagram of a trigger control in an embodiment of this application. As shown in FIG. 2, the terminal plays a video picture 21 in a video playback interface 20, and the video picture 21 includes a trigger control 22, where the trigger control 22 is not a display object originally included in the video picture 21, but is an object which is additionally added to an upper layer of the video picture 21 by the terminal and displayed in a floating manner.

Step 12. Pause playback of the video in response to an activation operation on the trigger control, and display a reference picture frame in the video playback interface during playback of the video, the reference picture frame being a picture frame corresponding to a pause time point in the video.

When the video is played to a picture including a target object, the user may perform an activation operation on the trigger control (such as a click and touch operation). In this case, the terminal can pause playback of the video, so that the user may select a target object to which an additional object needs to be added.

As shown in FIG. 2, the trigger control 22 can accept the user's click and touch operation. When the user's click and touch operation on the trigger control 22 is detected, the terminal pauses playback of the video, and the trigger control 22 enters an active state. In this case, a paused video picture frame is the reference picture frame described above.

Step 13. Obtain a target object in response to a drag operation on the trigger control, the target object being a display object corresponding to an end position of the drag operation in the reference picture frame.

In the embodiments of this application, after the terminal responds to the user's activation operation on the trigger control, the trigger control can accept the user's drag operation. When the drag operation ends, the terminal can obtain the target object in the reference picture frame according to an end position of the drag operation.

As shown in FIG. 2, the reference picture frame includes several display objects, such as a character object 23, a house 24, a hill 25, and the like. After the trigger control 22 enters the active state, the user can drag the trigger control 22 through a touch and slide operation, and a display object (that is, the character object 23 in FIG. 2) at the position of the trigger control 22 at the end of the drag operation is determined as the target object.

After obtaining the target object in the reference picture frame, the terminal may track the target object in each picture frame of the video, and obtain first display information, the first display information being used for indicating at least one of a display position, a display size, and a display posture of the target object in each picture frame. The terminal generates second display information according to the first display information, the second display information being used for indicating at least one of a display position, a display size, and a display posture of the additional object in each picture frame.

Step 14. Display, corresponding to the target object, an additional object corresponding to the trigger control in a picture frame of the video during playback of the video.

In the embodiments of this application, after determining the target object, the terminal may display, corresponding to the target object, an additional object corresponding to the trigger control in the video playback interface during subsequent playback of the video. Displaying, corresponding to the target object, an additional object corresponding to the trigger control may mean displaying an additional object on an upper layer of the target object, or displaying an additional object around the target object, or displaying an additional object at a relative position corresponding to the target object.

For example, when an additional object corresponding to the trigger control is displayed corresponding to the target object, after the target object is determined, the terminal may display the additional object in each picture frame according to the second display information when playing the video.

As shown in FIG. 2, after the terminal determines that the character object 23 is the target object, during subsequent playback of the video, when a played picture frame includes the character object 23, an additional object 24 is displayed corresponding to the character object 23.

Through the process shown in FIG. 1, the terminal displays a trigger control in a video playback interface in advance, pauses the video playback when detecting a user's activation operation on the trigger control, determines, when receiving a drag operation on the trigger control subsequently, a display object corresponding to an end position of the drag operation as a target object, and displays an additional object corresponding to the same target object in each picture frame during subsequent playback, thereby achieving the effect of making an additional object match a video playback picture during playback of the video.

In the solution provided in the embodiment shown in FIG. 1 of this application, when displaying the additional object corresponding to the trigger control in the video, the terminal may display the additional object according to a preset position relationship between the additional object and the target object, or the terminal may display the additional object according to a position relationship between the additional object and the target object that is set by the user when the user selects the target object.

Figure 3:
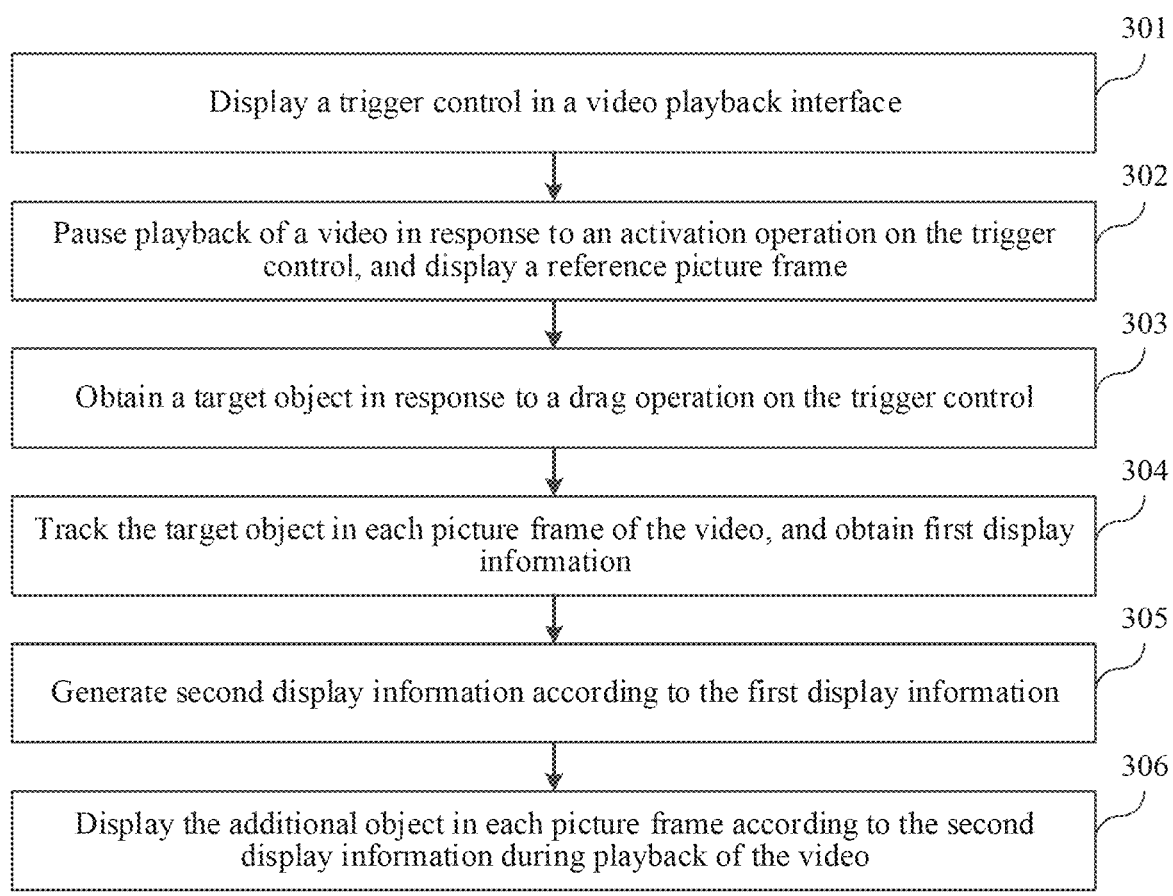
FIG. 3 is a flowchart of an additional object display method according to an exemplary embodiment of this application.

FIG. 3 is a flowchart of an additional object display method according to an exemplary embodiment of this application. The additional object display method may be performed by a terminal. The method may include the following steps:

Step 301. Display a trigger control in a video playback interface.

Step 302. Pause playback of the video in response to an activation operation on the trigger control, and display a reference picture frame in the video playback interface during playback of the video, the reference picture frame being a picture frame corresponding to a pause time point in the video.

Step 303. Obtain a target object in response to a drag operation on the trigger control, the target object being a display object corresponding to an end position of the drag operation in the reference picture frame.

For the solution of step 301 to step 303, refer to step 11 to step 13 in FIG. 1, and details are not described herein again.

Optionally, the terminal further displays a preview picture of the additional object in the video playback interface.

In the embodiments of this application, after the trigger control is activated (that is, after the activation operation on the trigger control is received), a preview picture of the additional object may be moved along with the trigger control in the video playback interface.

Figure 4:
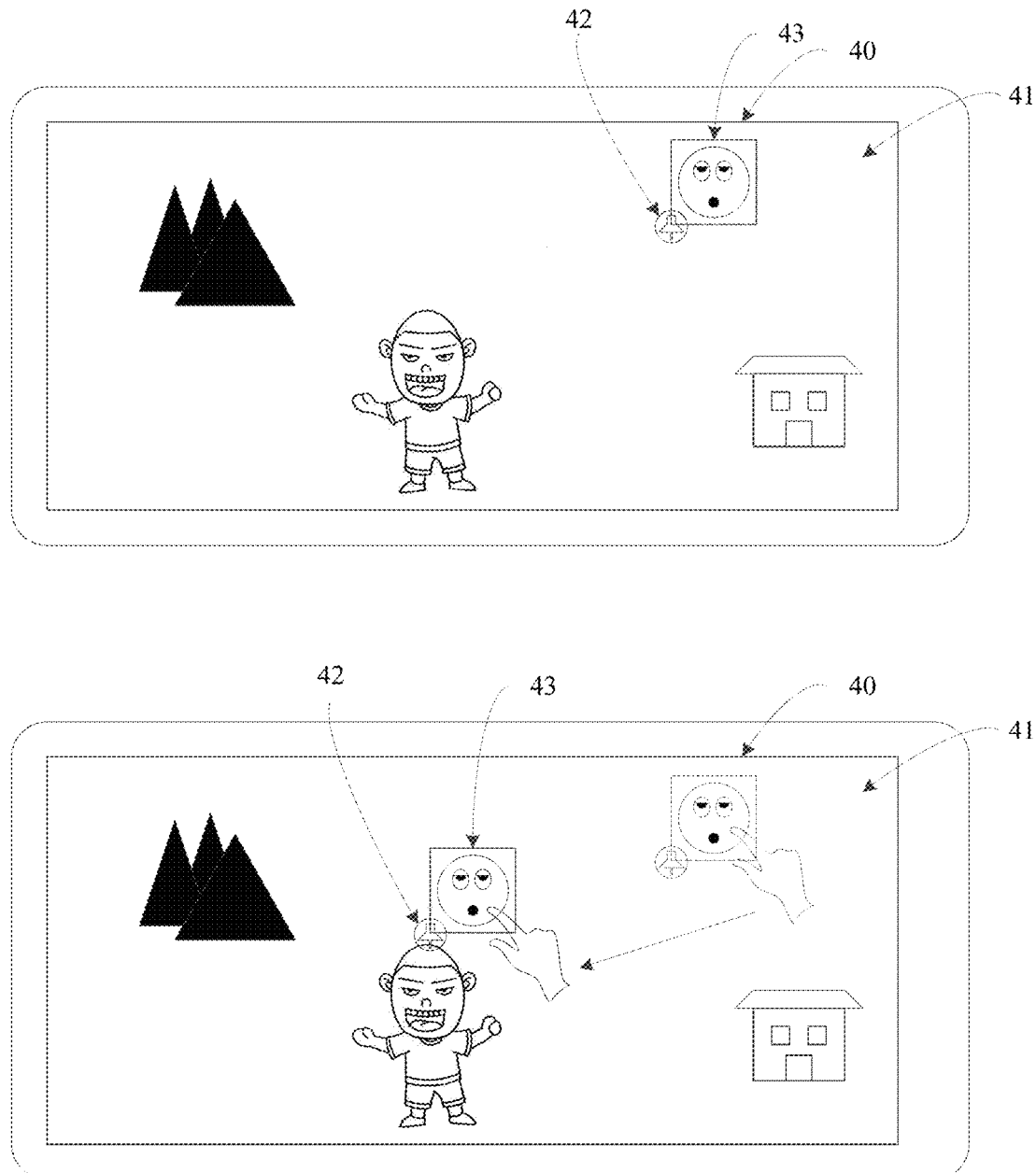
FIG. 4 is a display interface diagram of a trigger control and a preview picture of an additional object in the embodiment of FIG. 3.

For example, FIG. 4 is a display interface diagram of a trigger control and a preview picture of an additional object in an embodiment of this application. As shown in FIG. 4, the terminal plays a video picture 41 in a video playback interface 40. The video picture 41 includes a trigger control 42 and a preview picture 43 of an additional object. When receiving the user's drag operation on the trigger control 42, the terminal moves the trigger control 42 and the preview picture 43 of the additional object to a new position in the video picture 41 together.

Optionally, an operation point of the drag operation on the trigger control is located in an area corresponding to the trigger control or the preview picture of the additional object. That is, in the embodiments of this application, a drag operation performed by the user on a trigger control or a preview picture of an additional object may be regarded as a drag operation on the trigger control.

For example, in FIG. 4, when the user starts dragging from the position where the trigger control 42 or the preview picture 43 of the additional object is located, the user can move the position of the trigger control 42 and the preview picture 43 of the additional object in the video picture 41.

Optionally, the terminal displays, corresponding to the trigger control, a switch control in the video playback interface, displays an additional object selection interface in response to an activation operation on the switch control, the additional object selection interface including at least two candidate objects, and obtains, in response to a selection operation in the additional object selection interface, a candidate object corresponding to the selection operation as a new additional object corresponding to the trigger control.

Figure 5:
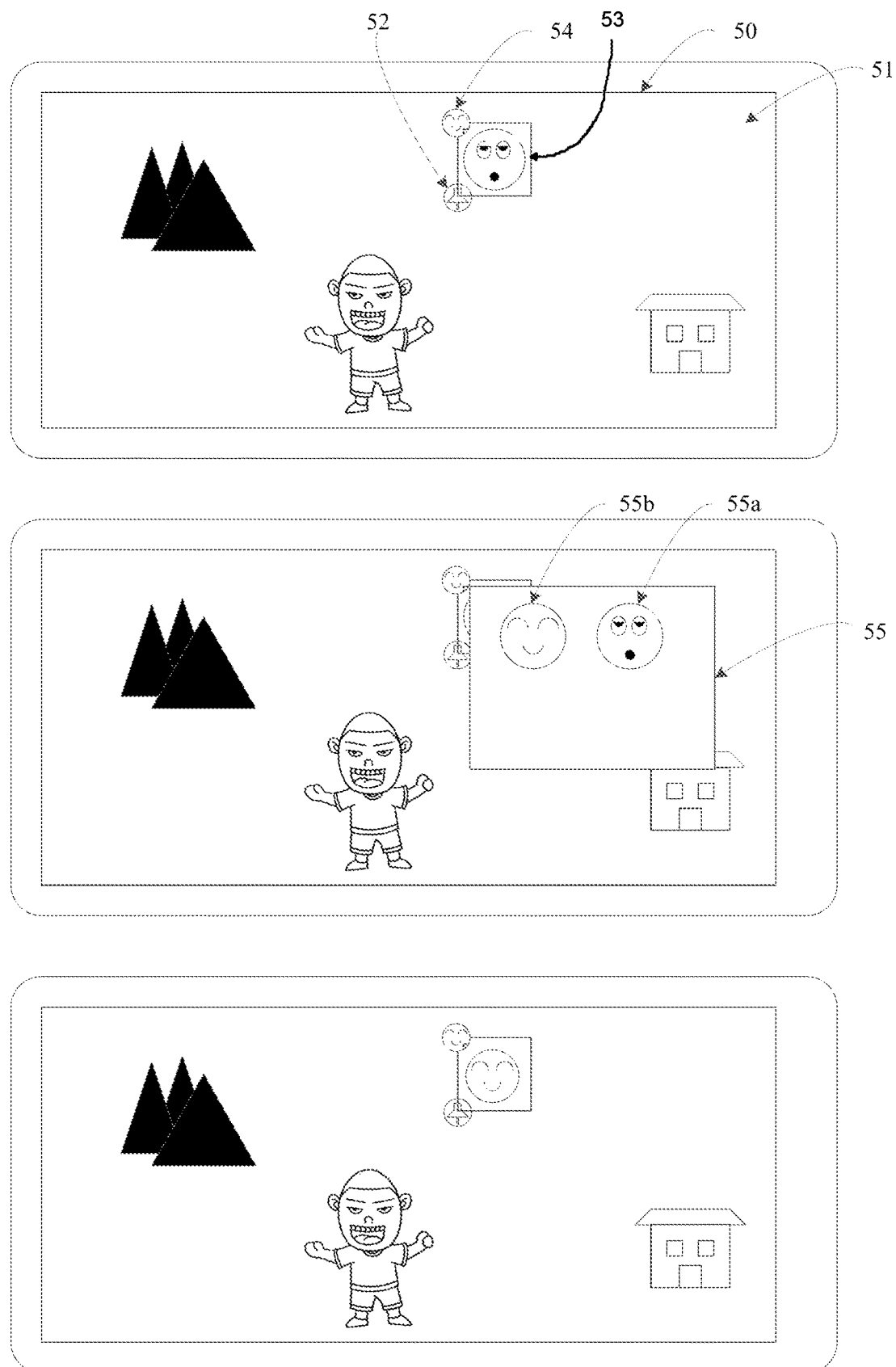
FIG. 5 is a schematic diagram of switching an additional object in the embodiment of FIG. 3.

In the embodiments of this application, the user may also freely switch the additional object corresponding to the trigger control. For example, FIG. 5 is a schematic diagram of switching an additional object in an embodiment of this application. As shown in FIG. 5, the terminal plays a video picture 51 in a video playback interface 50. The video picture 51 includes a trigger control 52, a preview picture 53 of an additional object, and a switch control 54. When receiving the user's click operation on the switch control 54 (that is, the activation operation on the switch control), the terminal displays an additional object selection interface 55. The additional object selection interface 55 includes a candidate object 55a and a candidate object 55b, where the candidate object 55a corresponds to a current additional object. Further, when receiving the user's click operation (that is, the selection operation) on the candidate object 55b, the terminal switches the content displayed in the preview picture 53 of the additional object to the preview picture of the candidate object 55b.

Optionally, when displaying the preview picture of the additional object in the video playback interface, the terminal also displays a zoom control corresponding to the preview picture of the additional object, zooms in or out the preview picture of the additional object in response to a zoom operation on the zoom control, and obtains a size of the preview picture of the additional object after zooming as a new display size of the additional object.

In the embodiments of this application, the terminal may record a size of the preview picture of the additional object in the video playback interface as a display size of the additional object, and the user can freely zoom in or out the display size of the additional object.

Figure 6:
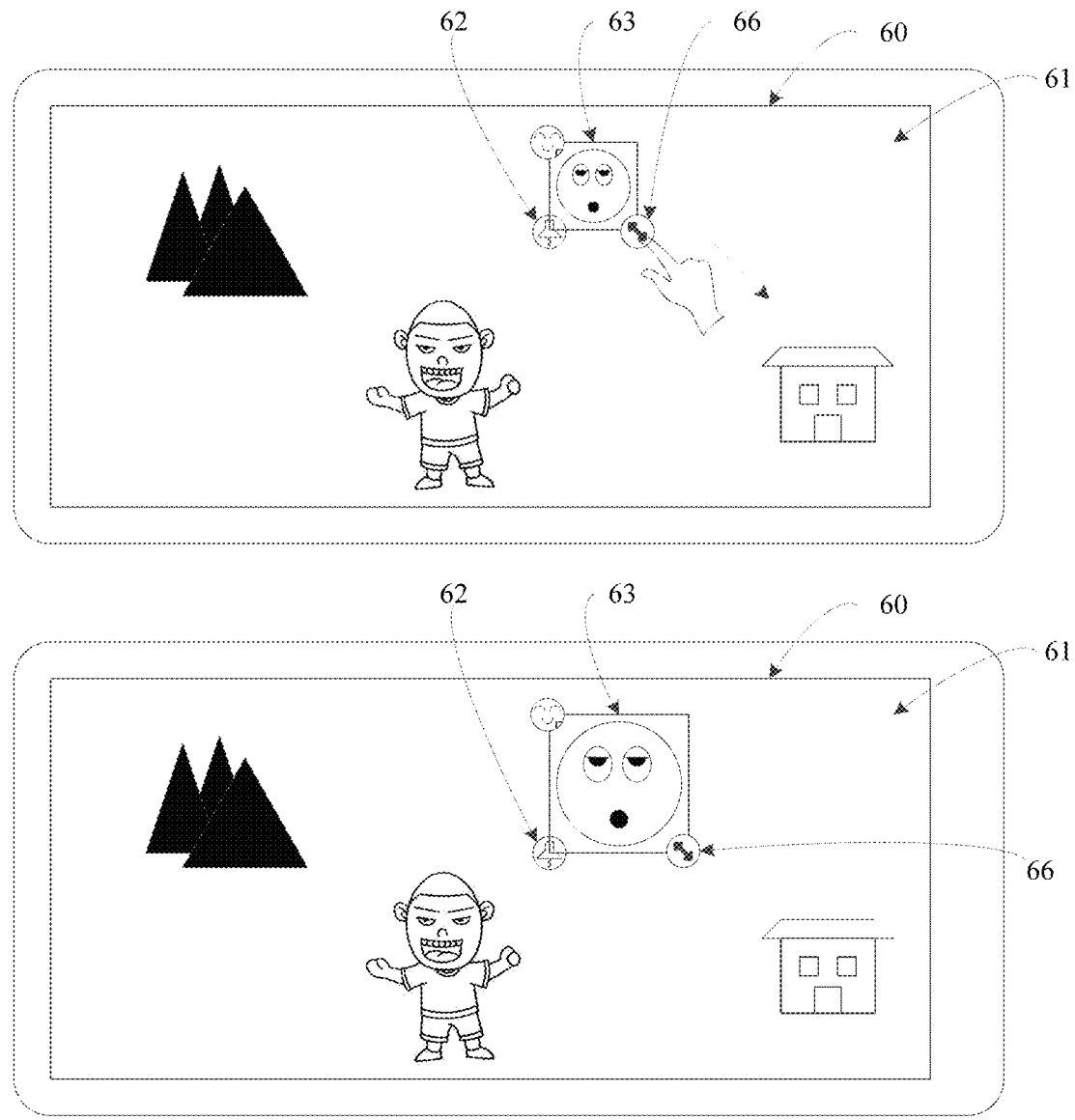
FIG. 6 is a schematic diagram of zooming in/out an additional object in the embodiment of FIG. 3.

For example, FIG. 6 is a schematic diagram of zooming in/out an additional object in an embodiment of this application. As shown in FIG. 6, the terminal plays a video picture 61 in a video playback interface 60. The video picture 61 includes a trigger control 62, a preview picture 63 of an additional object, and a zoom control 66. When receiving the user's zoom operation on the zoom control 66 (that is, the zoom operation on the zoom control), the terminal adjusts a size of the preview picture 63 of the additional object, and obtains a size of the preview picture 63 of the additional object after adjustment as a new display size of the additional object.

Optionally, the terminal obtains a display position of the preview picture in the reference picture frame, and obtains relative position information between the additional object and a target point according to the display position of the preview picture in the reference picture frame and a corresponding end position of the drag operation in the reference picture frame.

In the embodiments of this application, when the user drags the trigger control, the preview picture of the additional object may not move with the trigger control. After receiving the drag operation on the trigger control, the terminal may obtain the relative position information between the additional object and the target point according to the position of the preview picture in the reference picture frame and the end position of the drag operation.

For example, at an initial moment, the trigger control is at the lower left corner of the preview picture. After the user drags the trigger control, the trigger control is 30 degrees to the left below the lower left corner of the preview picture, with a distance of 200 pixels, so that the relative position information between the additional object and the target point that can be obtained by the terminal is as follows: the target point is 30 degrees to the left below the lower left corner of the preview picture, with a distance of 200 pixels.

Optionally, the terminal moves a position of the preview picture of the additional object in the video playback interface in response to a drag operation on the preview picture of the additional object.

Figure 7:
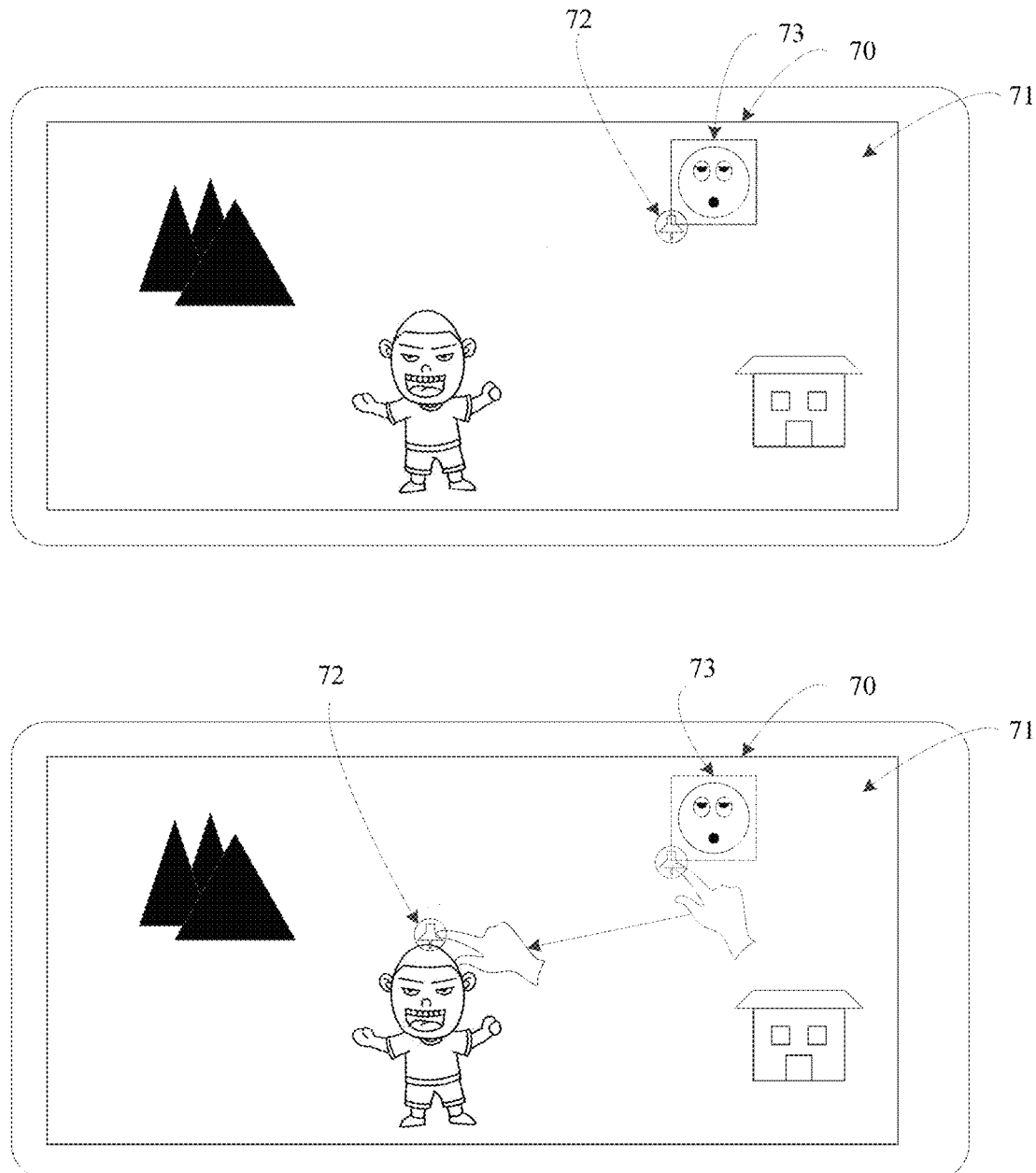
FIG. 7 is a display interface diagram of a trigger control and a preview picture of an additional object in the embodiment of FIG. 3.

In the embodiments of this application, the user may move the position of the trigger control and the position of the preview picture of the additional object separately. For example, FIG. 7 is a display interface diagram of a trigger control and a preview picture of an additional object in an embodiment of this application. As shown in FIG. 7, the terminal plays a video picture 71 in a video playback interface 70. The video picture 71 includes a trigger control 72 and a preview picture 73 of an additional object. When the terminal receives the user's drag operation on the trigger control 72, the trigger control 72 moves to a new position. A position of the preview picture 73 of the additional object remains unchanged during the process. Correspondingly, when the terminal receives the user's drag operation on the preview picture 73, the preview picture 73 moves to a new position, and a position of the trigger control 72 remains unchanged in this case.

Step 304. Track the target object in each picture frame of the video, and obtain first display information, the first display information being used for indicating at least one of a display position, a display size, and a display posture of the target object in each picture frame.

The picture frames may refer to all picture frames in the video, or some of picture frames in the video. For example, when the picture frame refer to some of picture frames in the video, the picture frames may be all picture frames that are after the reference picture frame in the video, or all picture frames that are before the reference picture frame in the video, or picture frames within a period of time before or after the reference picture frame in the video.

Optionally, the terminal tracks the target object in each picture frame of the video by using a CMT algorithm, and obtains the first display information.

Figure 8:
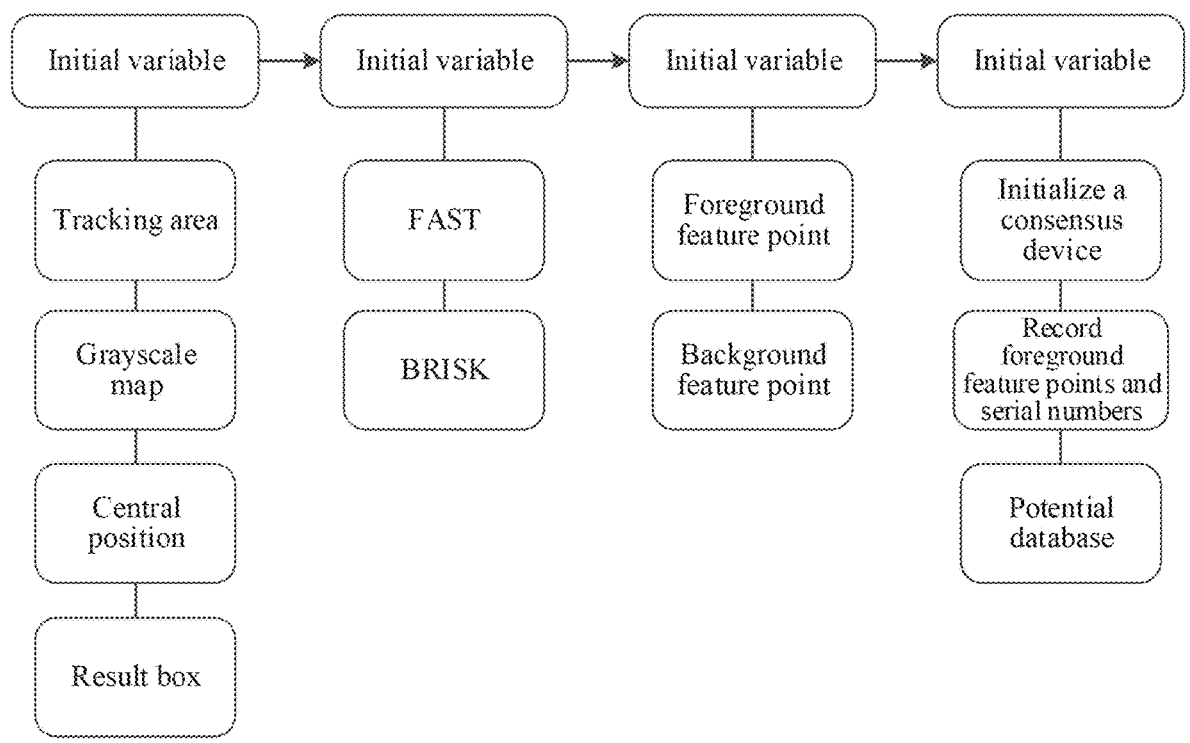
FIG. 8 shows an initialization process of a CMT algorithm in the embodiment of FIG. 3.
Figure 9:
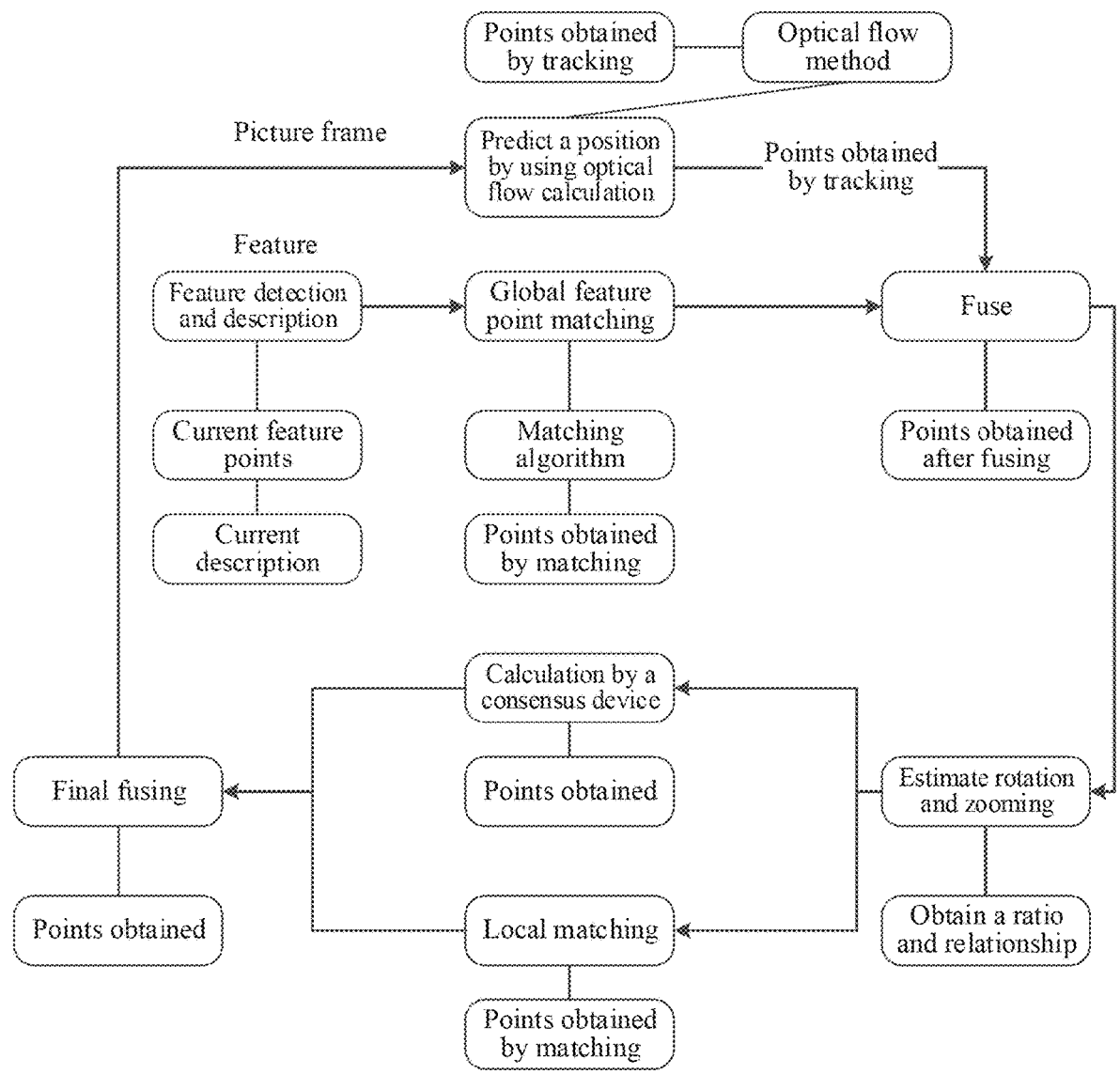
FIG. 9 is a diagram of a processing flow of each picture frame of a CMT algorithm in the embodiment of FIG. 3.

In the embodiments of this application, for operating systems of different terminals, the CMT algorithm can be used as a tracking algorithm, that is, the solution shown in this application can support multiple platforms. When tracking the target object in each picture frame by using the CMT algorithm, the terminal first processes an initialization algorithm, a to-be-tracked image, and a tracking area, and then performs matching processing on each subsequent picture frame. Referring to FIG. 8 and FIG. 9, FIG. 8 shows an initialization process of a CMT algorithm in an embodiment of this application, and FIG. 9 is a diagram of a processing flow (finding a matching area in a picture frame) of each picture frame of a CMT algorithm in an embodiment of this application.

The initialization of the CMT algorithm shown in FIG. 8 is described as follows:

1. Create initial variables, including a tracking area, a grayscale map of an initial frame, a central position of an object, and a position of a result. A feature detection algorithm for an initial picture may be a features from accelerated segment test (FAST) algorithm, and a feature point description algorithm may be a binary robust invariant scalable keypoints (BRISK) algorithm.

2. Detect feature points of an image of a first frame, including foreground feature points (points in a target selection box) and background feature points (points outside the target selection box), and construct a data set of a potential database (database_potential) including the foreground feature points and the background feature points.

3. Initialize a feature point matcher to match feature points of two images. Initialize a consensus device, to evaluate a rotation angle and a scale factor of a target; and store (foreground points) feature points and serial numbers of a target area.

As shown in FIG. 9, the process of processing each picture frame by the CMT algorithm is described as follows:

1. Use a feature point detection (FAST) algorithm and a description (BRISK) algorithm to perform feature detection and description on feature points of a current image.

2. Globally match target feature points of a first frame that are previously stored with current feature points to obtain matched points.

3. Use the optical flow method to predict feature points of a target in a current frame according to target feature points obtained from the last match.

4. Fuse points obtained by global matching and points tracked by using the optical flow method (that is, make a union set).

5. Estimate the zooming and rotation of the target, and then use points obtained by local matching and points calculated by the consensus device to make a union set to obtain target feature points.

The consensus device is configured to estimate points of a target area according to rotation and zooming. The local matching refers to comparing Euclidean distances between each keypoint detected in a current frame and all foreground keypoints after rotation and zooming in a first frame. If the Euclidean distance is less than a threshold (for example, the threshold may be set to 20 in advance), it means that the foreground keypoint is likely to match the keypoint detected in the current frame, and then the possible foreground keypoints are used to build a feature description database database_potential. Then a feature description of each keypoint detected in the current frame is matched with database_potential by knnMatch, and multiple (such as two) optimal matching results are searched in database_potential for each feature descriptor. A strategy for eliminating unstable keypoints is similar to that of the global matching.

Through the CMT algorithm, the terminal can track information such as the position, size, and posture of the target object included in each picture frame of the video (that is, the first display information).

Step 305. Generate second display information according to the first display information, the second display information being used for indicating at least one of a display position, a display size, and a display posture of the additional object in each picture frame.

Optionally, the first display information includes pixel coordinates of a target point in the target object in each picture frame. The terminal obtains pixel coordinates of the additional object in each picture frame according to the pixel coordinates of the target point in the target object in each picture frame and relative position information between the additional object and the target point; and generates the second display information including the pixel coordinates of the additional object in each picture frame.

In the embodiments of this application, position information indicated by the first display information may be pixel coordinates of a target point in the target object in each picture frame, where the target point may be a position point corresponding to an end position of the user's drag operation on the trigger control in the target object. For example, when the user drags the trigger control to a nose tip of a character A in the reference picture frame, a target point in each picture frame including the character A is a position point of the nose tip of the character A in the corresponding picture frame, and correspondingly, the generated first display information also includes pixel coordinates of the position point of the nose tip of the character A in each picture frame. The terminal subsequently obtains pixel coordinates of the additional object in each picture frame according to the pixel coordinates of the position point of the nose tip of the character A in each picture frame and relative position information between the additional object and the target point.

Optionally, the terminal obtains a display position of the preview picture in the reference picture frame, and obtains relative position information between the additional object and the target point according to the display position of the preview picture in the reference picture frame and the corresponding end position of the drag operation in the reference picture frame.

For example, in FIG. 4, a lower left corner of the display position of the preview picture of the additional object in the reference picture frame coincides with the target point (that is, a position point of the trigger control after dragging), and therefore, the relative position information between the additional object and the target point may be that the target point coincides with the lower left corner of the additional object.

Optionally, the first display information includes the display size of the target object in each picture frame. When generating the second display information according to the first display information, the terminal calculates a zoom ratio of the additional object in each picture frame according to the display size of the target object in each picture frame and an original size of the target object, the original size of the target object being a display size of the target object in the reference picture frame. The terminal obtains the display size of the additional object in each picture frame according to an original size of the additional object and the zoom ratio, and generates the second display information including the display size of the additional object in each picture frame.

In the embodiments of this application, the display size of the target object in different picture frames may vary. Correspondingly, when generating the second display information, the terminal may determine the display sizes of the additional object in different picture frames according to a multiple relationship between the display size of the target object in each picture frame and the original size of the target object (that is, the zoom ratio) and with reference to the original size of the additional object, so that the additional object is zoomed in or out as the target object changes in size in different picture frames.

Optionally, the first display information includes the display position and the display posture of the target object in each picture frame. When generating the second display information according to the first display information, the terminal obtains the display position and the display posture of the additional object in each picture frame according to the display position and the display posture of the target object in each picture frame and the relative position information between the additional object and the target point; and generates the second display information including the display position and the display posture of the additional object in each picture frame.

In the embodiments of this application, the position and posture of the target object in different picture frames may also vary. Correspondingly, when generating the second display information, the terminal may determine the positions and postures of the additional object in different picture frames according to the position and posture of the target object in each picture frame, so that the position and posture of the additional object changes with the position and posture of the target object in different picture frames (for example, deflection).

Optionally, when tracking the target object in each picture frame of the video and obtaining the first display information, the terminal tracks, starting from the reference picture frame the target object frame by frame in each picture frame in a chronological order and/or reverse order of playback time, and obtains the first display information.

In the embodiments of this application, the terminal may track, starting from the reference picture frame, the target object in picture frames after the reference picture frame in a chronological order of playback time, or track, starting from the reference picture frame, the target object in picture frames before the reference picture frame in a reverse order of playback time, or track, starting from the reference picture frame, the target object in picture frames before and after the reference picture frame in a chronological order and reverse order of playback time respectively.

Optionally, when tracking the target object in each picture frame of the video, the terminal may also track, starting from the reference picture frame, the target object only in picture frames for a short period of time before and after the reference picture frame. For example, the terminal tracks the target object in picture frames for a short period of time after the reference picture frame. In a possible implementation, the terminal may determine, according to a preset tracking duration (for example, 5 s), picture frames that are played within the preset tracking duration after a playback time point corresponding to the reference picture frame, and track the target object only in the determined picture frames, where the preset tracking duration may be set in the terminal by a developer in advance, or may be set by a user.

In another possible implementation, the terminal may also track, starting from the reference picture frame, the target object frame by frame in a chronological order of playback time. If the target object is tracked, the terminal continues to track the target object in the next frame, and if the target object is not tracked in a certain picture frame, the terminal stops tracking the target object.

Step 306. Display the additional object in each picture frame according to the second display information, during playback of the video.

Figure 10:
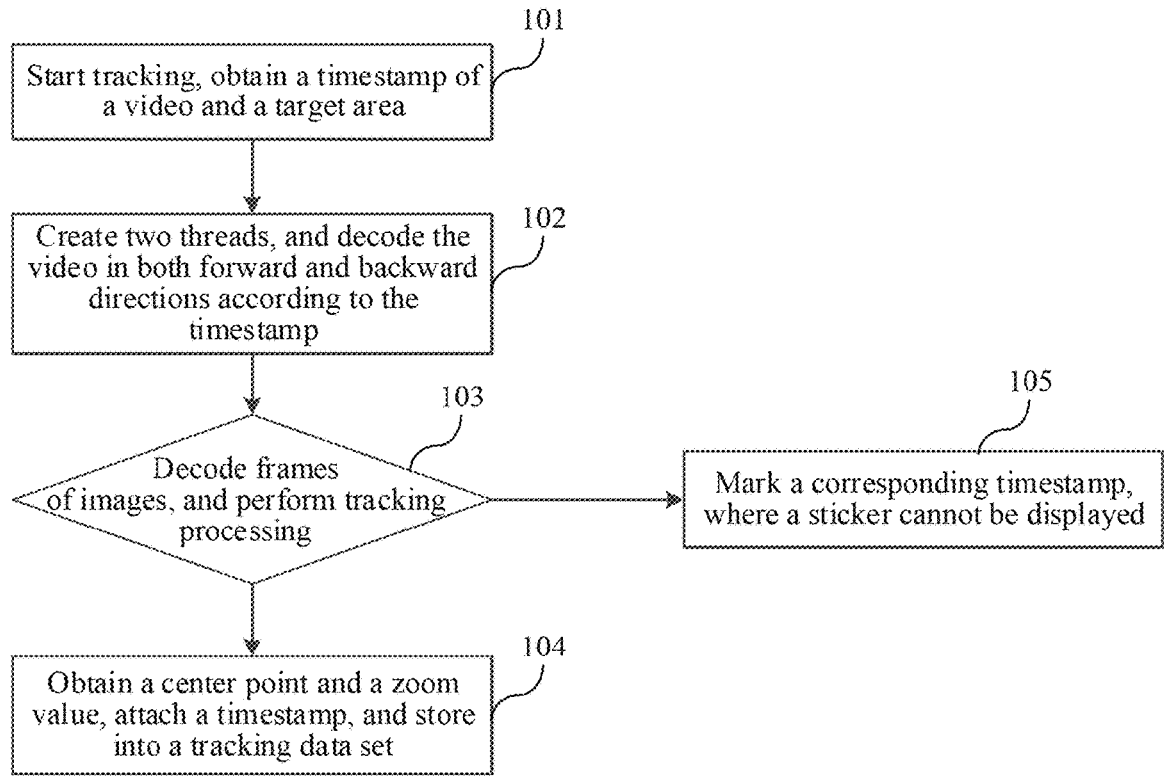
FIG. 10 is a diagram of an object tracking process in the embodiment of FIG. 3.

Object tracking (that is, the process of generating the first display information and the second display information) and displaying the additional object in each picture frame may be two parallel processes. FIG. 10 is a diagram of an object tracking process in an embodiment of this application. As shown in FIG. 10, the additional object being a sticker is used as an example to describe steps of the object tracking process as follows:

Step 101. Start tracking after a target object corresponding to a sticker is obtained and an operation of starting tracking is detected (for example, a user clicks an area other than the sticker in a video playback interface), obtain a video frame image A when a video is still, track an area B where the sticker is located, initialize tracking objects (including two tracking objects, for simultaneous forward and backward tracking) according to the image A and the area B, and obtain a timestamp C and a video duration D of the current video.

Step 102. Create two threads, and decode the video in both forward and backward directions at the timestamp C, where decoding is performed from the timestamp C to time 0 in one thread, and decoding is performed from the timestamp C to the video duration D in the other thread.

Step 103. Obtain frames of images and corresponding timestamps after the video is decoded in the two threads, where the terminal delivers each frame of image to the tracking objects for tracking processing.

Step 104. Obtain two results after the tracking processing; if the target object is tracked in the image, a center point and a zoom value are obtained, the image is attached with a timestamp corresponding to a frame object and a mark indicating that the sticker can be displayed, and is stored in a dictionary.

Step 105. If the target object is not tracked, the image is also attached with a timestamp, and a mark indicating that the sticker cannot be displayed, and is stored in the dictionary.

After the tracking is completed, the terminal obtains a dictionary with timestamp as key and tracking data as value. The tracking data includes information indicating whether the target object is tracked (used for controlling whether the sticker is displayed at a corresponding timestamp), and further includes a center point and a zoom value, the center point and the zoom value being used for controlling changes of the position and size of the sticker. Playback is continued in a video preview interface. During the playback, each frame rendered has a timestamp. The terminal searches according to a timestamp, for tracking data corresponding to the timestamp in the dictionary. If the tracking data is found, the terminal changes attributes of the sticker according to the tracking data, and the dynamic sticker also changes the displayed image according to the timestamp. During the preview, the sticker and the video are two separate views, so that the terminal may continuously process the sticker, and synthesize the video picture and the sticker when generating and displaying the video. Each frame in the video has a timestamp during synthesis. The terminal obtains information (position, size, and sticker image) about the sticker according to the timestamp, generates a changed sticker, and then fuses the sticker with the video frame.

In summary, in the solution shown in the embodiments of this application, the terminal displays a trigger control in a video playback interface in advance, pauses the video playback when detecting a user's activation operation on the trigger control, determines, when subsequently receiving a drag operation on the trigger control, a display object corresponding to an end position of the drag operation as a target object, and displays an additional object corresponding to the same target object in each picture frame during subsequent playback, thereby achieving the effect of making an additional object match a video playback picture during playback of the video.

In addition, in the solution shown in the embodiments of this application, because the trigger control has been displayed in the video playback interface in advance, the user can add the additional object by the activation operation and drag operation in the current interface, thereby improving the efficiency of adding and displaying the additional object.

This technical solution is mainly designed for the function and interaction of a sticker (that is, an additional display object) in a follow mode, and ensures a good level of accuracy in tracking an object. In terms of functions, this solution supports the tracking of static stickers and dynamic stickers, and can track a target in an entire video. In terms of interaction, the user may click a nail (that is, a touch component corresponding to the additional display object) to pause the picture, and in this case, the user drags the sticker to mark a target position, clicks any area to start tracking, and continues to play the video after the processing is completed. The attributes of the sticker can be changed according to the tracking data during the playback.

Resources of dynamic stickers may be in the format of animated portable network graphics (APNG). After adding a dynamic sticker, the terminal decodes an APNG file, and then renders the dynamic sticker to a corresponding picture frame according to a timestamp, including finding an image corresponding to APNG according to a timestamp when the video is rendered. APNG is a bitmap animation extension of PNG, and can achieve a dynamic picture effect of a PNG format.

The solution provided in the embodiment shown in FIG. 3 may be applied to a scenario in which a sticker is added to a short video after the short video is shot. That is, after the short video is shot, a static or dynamic sticker may be added, a tracking target may be selected according to requirements, and then the tracking target is tracked in a close follow mode.

The above close follow mode refers to a mode in which a sticker additional object is displayed close to a target object in each picture frame.

Figure 11:
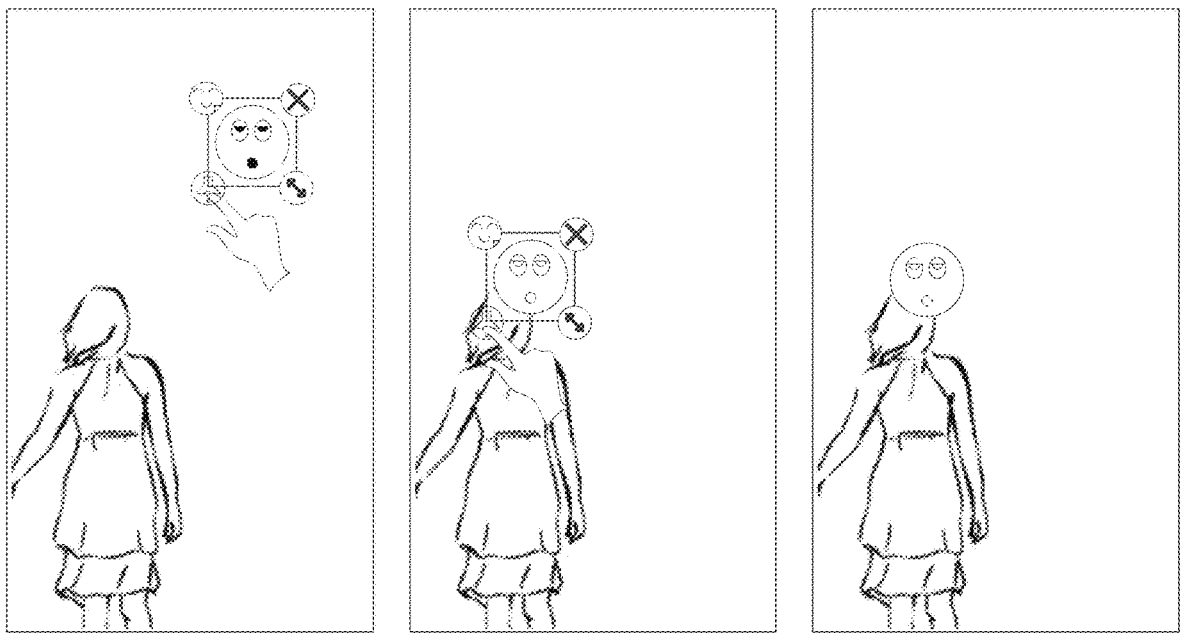
FIG. 11 is a schematic diagram of an operation of a close follow mode according to an exemplary embodiment of this application.

The additional object being a sticker is used as an example. FIG. 11 is a schematic diagram of an operation of a close follow mode according to an exemplary embodiment of this application. As shown in FIG. 11, the main steps of using the close follow mode of the sticker are as follows:

1. After a video is obtained (for example, after a video is shot), automatically enter a video editing interface, and add a (static or dynamic) sticker in an edit bar.

2. Click the sticker to be edited to enter an editing state, and an edit box appears.

3. During playback of the video, if there is a tracking target to be selected, a user can click a nail button (that is, a trigger control) at the bottom left of the edit box; then, the playback is paused in a video preview interface, and a transparent gray mask appears under the sticker, so that the sticker can be displayed more intuitively during the tracking operation.

4. The user drags the sticker for precise positioning, and then clicks an area other than the sticker.

5. The preview interface enters a loading state. Perform tracking processing, and resume playback of the video after the processing, where the position and size of the selected sticker are changed according to tracking data.

In the close follow mode of the sticker, a human face may be selected in actual use, thereby blocking the human face and making an entertaining video picture by using a dynamic sticker. In addition to blocking the human face, the close follow mode of the sticker may also be used in other scenarios, for example, blocking an object.

Figure 12:
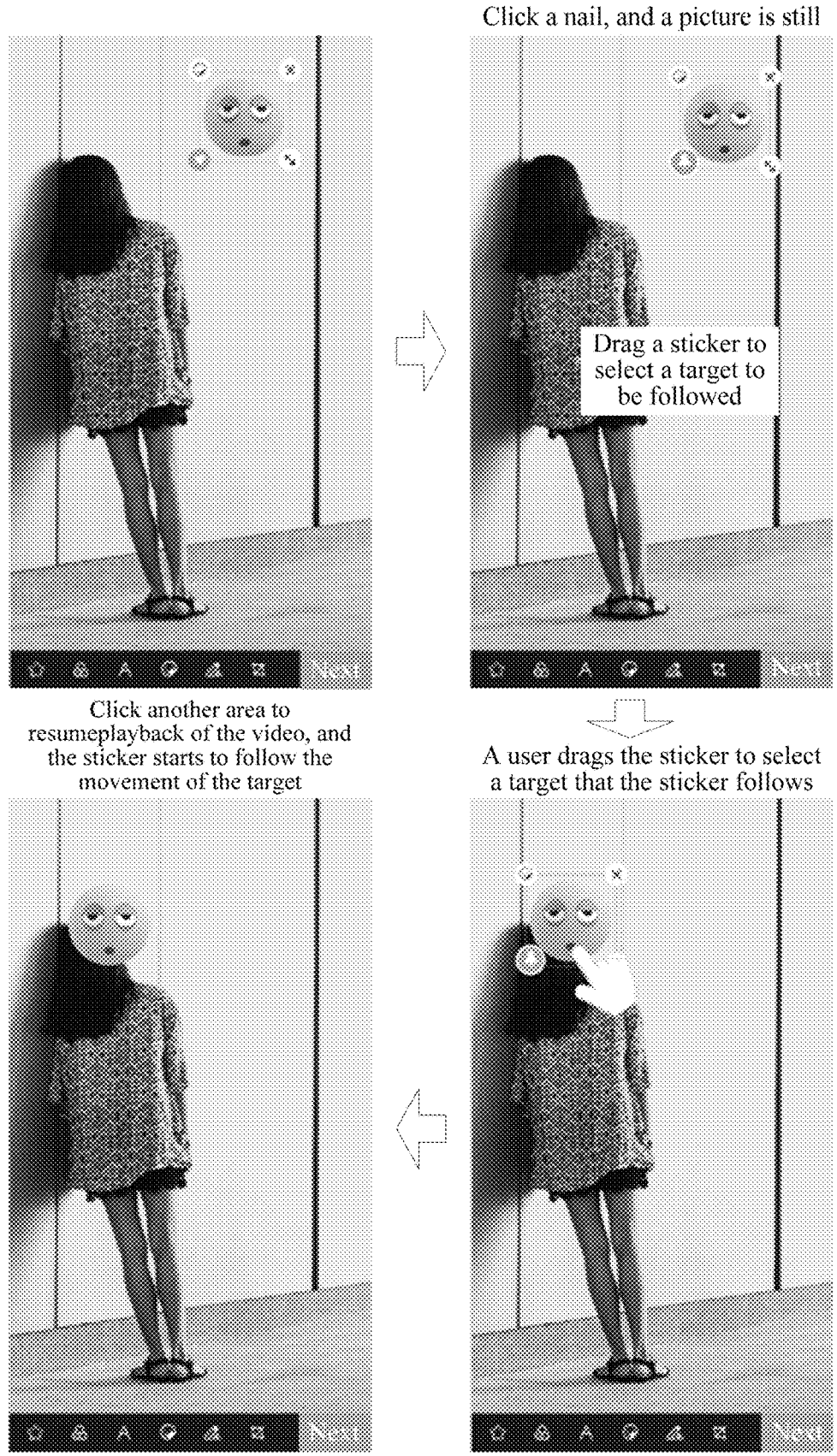
FIG. 12 is a schematic diagram of an operation of another close follow mode according to an exemplary embodiment of this application.

FIG. 12 is a schematic diagram of an operation of another close follow mode according to an exemplary embodiment of this application. As shown in FIG. 12, during playback of a video, a nail icon (that is, a trigger control) and a sticker are displayed on an upper layer of a picture. When a user clicks the nail, playback of the video is paused and the picture is still. After the picture is still, the user can drag the sticker on the still picture to select a target to be followed by the sticker (that is, the head of the character in FIG. 12). After the user clicks another area other than the sticker and the nail in the still picture, playback of the video is resumed, and the sticker begins to follow the movement of the selected target (the head of the character).

The solution provided in the embodiment shown in FIG. 3 may be applied to a scenario in which a sticker is added to a short video after the short video is shot. That is, after the short video is shot, a static or dynamic sticker may be added, a tracking target may be selected according to requirements, and then the tracking target is tracked in a kite mode.

Figure 13:
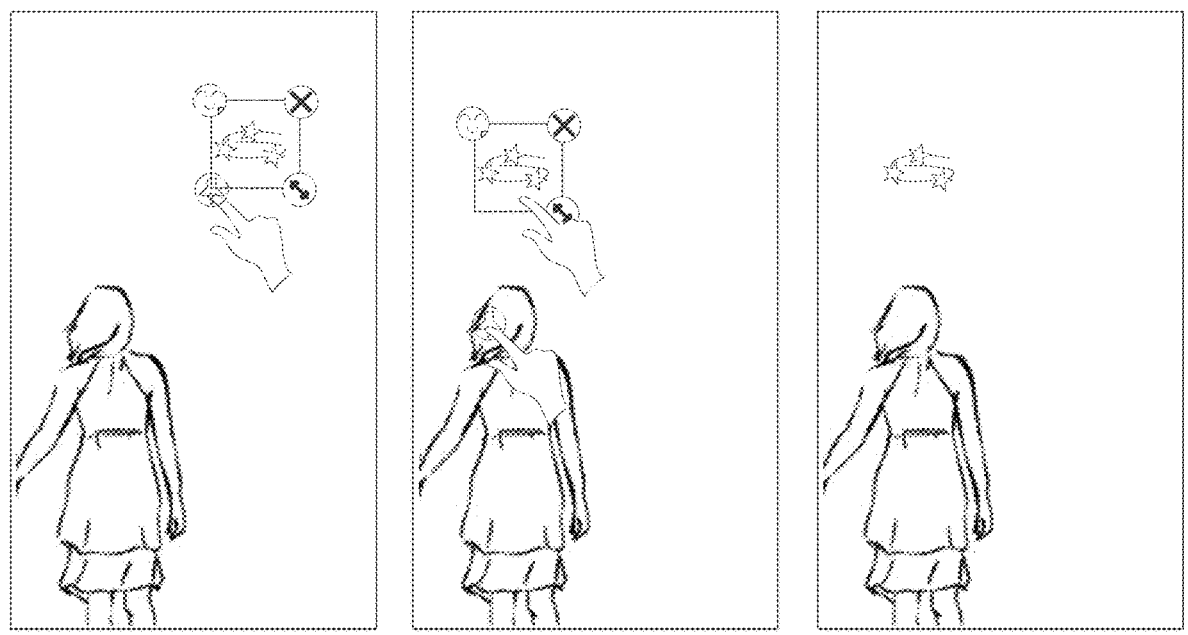
FIG. 13 is a schematic diagram of an operation of a kite mode according to an exemplary embodiment of this application.

The kite mode is a mode in which the sticker moves along with the target object without blocking the target object. The close follow mode may be strictly classified as a special scene in the kite mode, except that in the close follow mode, a tracking target area is an area where the sticker itself is located, while a selected area in the kite mode may be dragged at will, and the position and size of the sticker are appropriately changed according to relative position information between the sticker and the selected area. FIG. 13 is a schematic diagram of an operation of a kite mode according to an exemplary embodiment of this application. As shown in FIG. 13, the kite mode is as follows:

1. After a video is obtained (for example, after a video is shot), automatically enter a video editing interface, and add a (static or dynamic) sticker in an edit bar.

2. Click the sticker to be edited to enter an editing state, and an edit box appears.

3. During playback of the video, if there is a tracking target to be selected, a user can click a nail button (that is, a trigger control) at the bottom left of the edit box, playback is paused in a video preview interface, and a transparent gray mask appears under the sticker, so that the sticker can be displayed more intuitively during the tracking operation.

4. The user drags the nail, where the nail in a selected state can be dragged out independently of the sticker and dragged to a target to be tracked; at the same time, the user drags the sticker to precisely position the sticker. The terminal handles relative positions of the sticker and the nail, and then the user clicks an area other than the sticker.

5. The preview interface enters a loading state. Perform tracking processing, and resume playback of the video after the processing, where the position and size of the selected sticker are changed according to tracking data.

In a use scenario of the kite mode of the sticker, a dynamic sticker may be used to track a target, for example, to track a building. In this case, the sticker is displayed as an identifier of a geographical location to mark the building.

Figure 14:
FIG. 14 is a schematic diagram of an operation of another close follow mode according to an exemplary embodiment of this application.
Figure 14:
Figure 14:
Figure 14:

FIG. 14 is a schematic diagram of an operation of another kite mode according to an exemplary embodiment of this application. As shown in FIG. 14, during playback of the video, a nail icon (that is, a trigger control) and a sticker are displayed on an upper layer of a picture. Different from the mode shown in FIG. 12, in the mode shown in FIG. 14, when the picture is still, if the user presses on the nail, the nail can be dragged independently of the sticker by the user. When the user drags the nail to select a target corresponding to the sticker, a connection line may be displayed between the nail and the sticker to indicate a relative position relationship between the nail and the sticker. After the user finishes dragging and releases the finger, the nail is displayed in a flickering animation. After the user clicks another area other than the sticker and the nail in the still picture, playback of the video is resumed, and the sticker begins to follow the movement of the selected target in a kite-like form.

The solution provided in this application aims to resolve the problem of low efficiency in adding and displaying an additional object in a video editing stage, and can provide the user with two tracking modes (close follow mode and kite mode). Friendly operations are provided to accurately select a tracking target, and the tracking target is tracked in an entire short video provided that the tracking target is selected at any timestamp of the short video. The solution can ensure support for the capability of tracking dynamic stickers and enhance entertainment while ensuring the accuracy of tracking.

Figure 15:
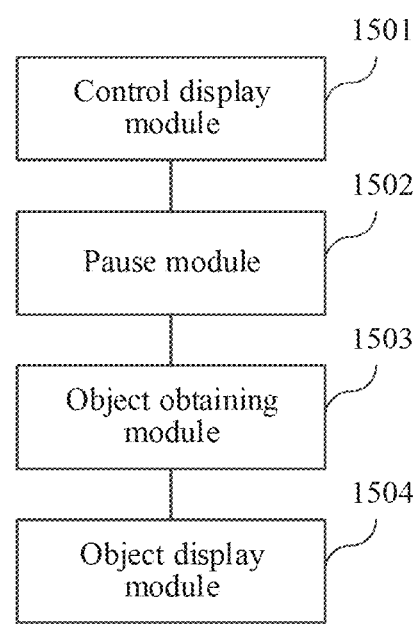
FIG. 15 is a structural block diagram of an additional object display apparatus according to an exemplary embodiment of this application.

FIG. 15 is a structural block diagram of an additional object display apparatus according to an exemplary embodiment of this application. The virtual object control apparatus may be used in a terminal, to perform all or some of the steps of the method shown in the embodiment of FIG. 1 or the embodiment of FIG. 3. The additional object display apparatus may include:

a control display module 1501, configured to display a trigger control in a video playback interface, the video playback interface being used for playing a video;

a pause module 1502, configured to pause playback of the video in response to an activation operation on the trigger control, and display a reference picture frame in the video playback interface, the reference picture frame being a picture frame corresponding to a pause time point in the video;

an object obtaining module 1503, configured to obtain a target object in response to a drag operation on the trigger control, the target object being a display object corresponding to an end position of the drag operation in the reference picture frame; and an object display module 1504, configured to display, corresponding to the target object, an additional object corresponding to the trigger control in a picture frame of the video during playback of the video.

Optionally, the apparatus further includes: a tracking module, configured to: before the object display module 1504 displays, corresponding to the target object, the additional object corresponding to the trigger control in the video, track the target object in each picture frame of the video, and obtain first display information, the first display information being used for indicating at least one of a display position, a display size, and a display posture of the target object in each picture frame;

an information generation module, configured to generate second display information according to the first display information, the second display information being used for indicating at least one of a display position, a display size, and a display posture of the additional object in each picture frame;

where the object display module 1504 is specifically configured to display the additional object according to the second display information in each picture frame during playback of the video.

Optionally, the first display information includes pixel coordinates of a target point in the target object in each picture frame, and the target point is a position point corresponding to the end position of the drag operation in the target object. The information generation module is specifically configured to:

obtain pixel coordinates of the additional object in each picture frame according to the pixel coordinates of the target point in the target object in each picture frame and relative position information between the additional object and the target point; and generate the second display information including the pixel coordinates of the additional object in each picture frame.

Optionally, the apparatus further includes: a preview picture display module, configured to display a preview picture of the additional object in the video playback interface;

a display position obtaining module, configured to obtain a display position of the preview picture in the reference picture frame; and a relative position obtaining module, configured to obtain the relative position information between the additional object and the target point according to the display position of the preview picture in the reference picture frame and the corresponding end position of the drag operation in the reference picture frame.

Optionally, the apparatus further includes: a movement module, configured to move a position of the preview picture of the additional object in the video playback interface in response to a drag operation on the preview picture of the additional object.

Optionally, the first display information includes the display size of the target object in each picture frame. The information generation module is specifically configured to:

calculate a zoom ratio of the additional object in each picture frame according to the display size of the target object in each picture frame and an original size of the target object, the original size of the target object being a display size of the target object in the reference picture frame;

obtain the display size of the additional object in each picture frame according to an original size of the additional object and the zoom ratio; and generate the second display information including the display size of the additional object in each picture frame.

Optionally, the first display information includes the display position and the display posture of the target object in each picture frame. The information generation module is specifically configured to:

obtain the display position and the display posture of the additional object in each picture frame according to the display position and the display posture of the target object in each picture frame and the relative position information between the additional object and the target point; and generate the second display information including the display position and the display posture of the additional object in each picture frame.

Optionally, the tracking module is specifically configured to track, starting from the reference picture frame the target object frame by frame in each picture frame in a chronological order and/or reverse order of playback time, and obtain the first display information.

Optionally, the tracking module is specifically configured to track the target object in each picture frame of the video by using a clustering of static-adaptive correspondences for deformable object tracking (CMT) algorithm, and obtain the first display information.

Optionally, the apparatus further includes: a switch control display module, configured to display, corresponding to the trigger control, a switch control in the video playback interface;

a selection interface display module, configured to display an additional object selection interface in response to an activation operation on the switch control, the additional object selection interface including at least two candidate objects; and an additional object obtaining module, configured to obtain, in response to a selection operation in the additional object selection interface, a candidate object corresponding to the selection operation as a new additional object corresponding to the trigger control.

Optionally, the additional object is a static display object or a dynamic display object.

Figure 16:
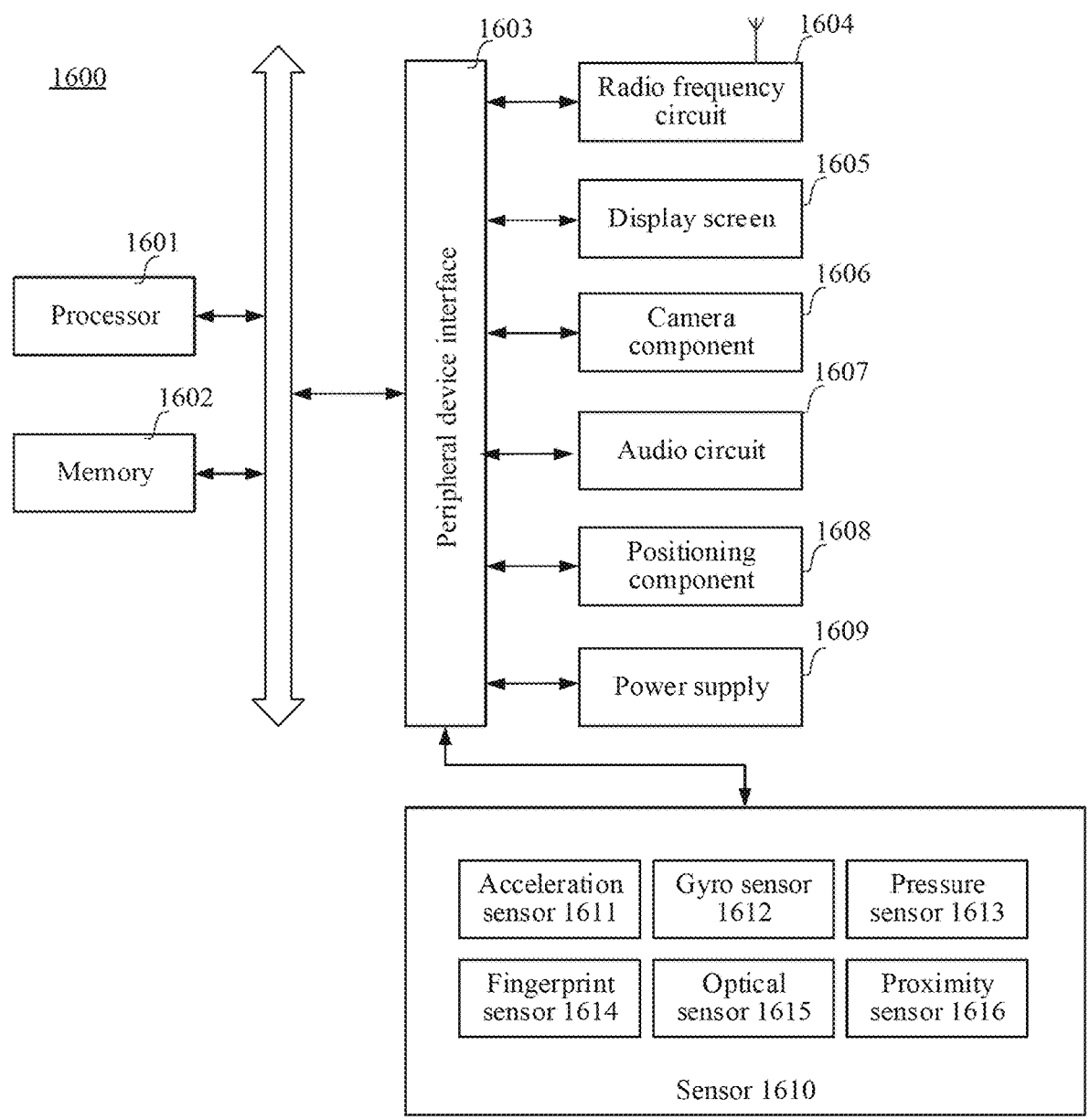
FIG. 16 is a structural block diagram of a computer device according to an exemplary embodiment of this application.

FIG. 16 is a structural block diagram of a terminal 1600 according to an exemplary embodiment of this application. The terminal 1600 may be a smartphone, a tablet computer, an MP3 (Moving Picture Experts Group Audio Layer III) player, an MP4 (Moving Picture Experts Group Audio Layer IV) player, a laptop, a desktop computer and the like. The terminal 1600 may also be referred to as user equipment, a portable terminal, a laptop terminal, a desktop terminal, and the like.

Generally, the terminal 1600 includes a processor 1601 and a memory 1602.

The processor 1601 may include one or more processing cores, for example, a 4-core processor or an 8-core processor. The processor 1601 may be implemented in at least one hardware form among digital signal processing (DSP), a field-programmable gate array (FPGA), or a programmable logic array (PLA). The processor 1601 may also include a main processor and a co-processor. The main processor is a processor for processing data in an awake state, also referred to as a central processing unit (CPU). The co-processor is a low-power processor for processing data in a standby state. In some embodiments, the processor 1601 may be integrated with a graphics processing unit (GPU), and the GPU is configured to render and draw content required to be displayed on a display screen. In some embodiments, the processor 1601 may further include an artificial intelligence (AI) processor, and the AI processor is configured to process a computing operation related to machine learning.

The memory 1602 may include one or more computer-readable storage media, and the computer-readable storage medium may be non-transitory. The memory 1602 may further include a high-speed random access memory, and a non-volatile memory such as one or more magnetic disk storage devices and a flash memory device. In some embodiments, the non-transitory computer-readable storage medium in the memory 1602 is used for storing at least one instruction, and the at least one instruction is executed by the processor 1601 to implement the additional object display method provided in the embodiments of this application.

In some embodiments, the terminal 1600 may further include a peripheral device interface 1603 and at least one peripheral device. The processor 1601, the memory 1602, and the peripheral device interface 1603 may be connected through a bus or a signal line. Each peripheral device may be connected to the peripheral device interface 1603 through a bus, a signal line, or a circuit board. Specifically, the peripheral device includes at least one of a radio frequency circuit 1604, a touch display screen 1605, a camera 1606, an audio circuit 1607, a positioning component 1608, and a power supply 1609.

The peripheral device interface 1603 may be configured to connect at least one peripheral device related to input/output (I/O) to the processor 1601 and the memory 1602. In some embodiments, the processor 1601, the memory 1602, and the peripheral device interface 1603 are integrated on the same chip or circuit board. In some other embodiments, any one or any two of the processor 1601, the memory 1602, and the peripheral device interface 1603 may be implemented on a single chip or circuit board. This is not limited in this embodiment.

The radio frequency circuit 1604 is configured to receive and transmit radio frequency (RF) signals, also referred to as electromagnetic signals. The radio frequency circuit 1604 communicates with another communications device by using an electromagnetic signal and a communications network. The radio frequency circuit 1604 converts electrical signals into electromagnetic signals for transmission, or converts received electromagnetic signals into electrical signals. Optionally, the radio frequency circuit 1604 includes an antenna system, an RF transceiver, one or more amplifiers, a tuner, an oscillator, a digital signal processor, a CODEC chip set, a subscriber identity module card, and the like. The radio frequency circuit 1604 can communicate with another terminal through at least one wireless communication protocol. The wireless communication protocol includes, but is not limited to, World Wide Web, a metropolitan area network, an intranet, mobile communication networks of all generations (2G, 3G, 4G, and 5G), a wireless local area network, and/or a wireless fidelity (WiFi) network. In some embodiments, the radio frequency circuit 1604 may further include circuits related to near field communication (NFC). This is not limited in this application.

The display screen 1605 is configured to display a user interface (UI). The UI may include graphics, texts, icons, videos, and any combination thereof. When the display screen 1605 is a touch display screen, the display screen 1605 is further capable of collecting touch signals on or above a surface of the display screen 1605. The touch signal may be inputted to the processor 1601 as a control signal for processing. In this case, the display screen 1605 may further be configured to provide a virtual button and/or a virtual keyboard, which is also referred to as a soft button and/or a soft keyboard. In some embodiments, there may be one display screen 1605, and the display screen 1605 is disposed on a front panel of the terminal 1600. In other embodiments, there may be at least two display screens 1605, which are disposed on different surfaces of the terminal 1600 or have a folded design. In still other embodiments, the display screen 1605 may be a flexible display screen disposed on a curved surface or a folded surface of the terminal 1600. Moreover, the display screen 1605 may also be set to be non-rectangular and irregular, that is, a special-shaped screen. The display screen 1605 may be made of materials such as liquid crystal display (LCD) and organic light-emitting diode (OLED).

The camera assembly 1606 is configured to collect an image or a video. Optionally, the camera assembly 1606 includes a front-facing camera and a rear-facing camera. Generally, the front-facing camera is disposed on the front panel of the terminal, and the rear-facing camera is disposed on the rear surface of the terminal. In some embodiments, there are two rear-facing cameras, where the rear-facing camera is any one of a main camera, a depth-of-field camera, a wide-angle camera, and a telephoto camera, to implement a background blur function by integration of the main camera and the depth-of-field camera, and implement a panoramic photo shooting function, a virtual reality (VR) shooting function or another integrated shooting function by integration of the main camera and the wide-angle camera. In some embodiments, the camera assembly 1106 may further include a flash. The flash may be a single color temperature flash or may be a dual color temperature flash. The dual color temperature flash is a combination of a warm light flash and a cold light flash and may be used for light compensation at different color temperatures.

The audio circuit 1607 may include a microphone and a speaker. The microphone is configured to collect sound waves of a user and an environment, and convert the sound waves into electrical signals and input the electrical signals to the processor 1601 for processing, or input the electrical signals to the radio frequency circuit 1604 to implement voice communication. For the purpose of stereo collection or noise reduction, there may be multiple microphones, and the microphones are respectively disposed at different parts of the terminal 1600. The microphone may also be an array microphone or an omnidirectional acquisition microphone. The speaker is configured to convert electrical signals from the processor 1601 or the radio frequency circuit 1604 into sound waves. The speaker may be a traditional film speaker or a piezoelectric ceramic speaker. When the speaker is a piezoelectric ceramic speaker, the speaker can not only convert electrical signals into sound waves audible to humans, but also convert electrical signals into sound waves inaudible to humans for ranging purposes. In some embodiments, the audio circuit 1607 may further include an earphone jack.

The positioning assembly 1608 is configured to locate a current geographical position of the terminal 1600, to implement navigation or a location-based service (LBS). The positioning assembly 1608 may be a positioning assembly based on US Global Positioning System (GPS), BeiDou Navigation Satellite System (BDS) of China, and Galileo System of Russia.

The power supply 1609 is configured to power various components in the terminal 1600. The power supply 1609 may be an alternating current, a direct current, a disposable battery, or a rechargeable battery. When the power supply 1609 includes a rechargeable battery, the rechargeable battery may be a wired rechargeable battery or a wireless rechargeable battery. The wired rechargeable battery is a battery charged through a wired line, and the wireless rechargeable battery is a battery charged through a wireless coil. The rechargeable battery may also be used to support fast charging technology.

In some embodiments, the terminal 1600 further includes one or more sensors 1610. The one or more sensors 1610 include, but are not limited to, an acceleration sensor 1611, a gyro sensor 1612, a pressure sensor 1613, a fingerprint sensor 1614, an optical sensor 1615, and a proximity sensor 1616.

The acceleration sensor 1611 can detect the magnitude of acceleration on three coordinate axes of a coordinate system established by the terminal 1600. For example, the acceleration sensor 1611 may be configured to detect the magnitude of gravity acceleration on three coordinate axes. The processor 1601 may control the touch display screen 1605 to display the user interface in a landscape mode or a portrait mode according to a gravity acceleration signal collected by the acceleration sensor 1611. The acceleration sensor 1611 may also be configured to collect motion data of a game or a user.

The gyro sensor 1612 may detect a body direction and a rotational angle of the terminal 1600, and may coordinate with the acceleration sensor 1611 to collect a 3D action of the user for the terminal 1600. According to data collected by the gyro sensor 1612, the processor 1601 may implement the following functions: motion sensing (for example, changing the UI according to a tilt operation of the user), image stabilization during shooting, game control, and inertial navigation.

The pressure sensor 1613 may be disposed on a side frame of the terminal 1600 and/or a lower layer of the touch display screen 1605. When the pressure sensor 1613 is disposed on the side frame of the terminal 1600, a user's holding signal on the terminal 1600 may be detected, and the processor 1601 can perform left-right hand recognition or quick operation according to the holding signal collected by the pressure sensor 1613. When the pressure sensor 1613 is disposed on the lower layer of the touch display screen 1605, the processor 1601 controls an operable control on the UI according to the user's pressure operation on the touch display screen 1605. The operable control includes at least one of a button control, a scroll bar control, an icon control, and a menu control.

The fingerprint sensor 1614 is configured to collect a fingerprint of a user, and the processor 1601 recognizes the identity of the user based on the fingerprint collected by the fingerprint sensor 1614, or the fingerprint sensor 1614 recognizes the identity of the user based on the collected fingerprint. When the user's identity is identified as trusted, the processor 1601 authorizes the user to perform related sensitive operations, such as unlocking the screen, viewing encrypted information, downloading software, payment, changing settings, and the like. The fingerprint sensor 1614 may be disposed on the front, back, or side of the terminal 1600. When a physical button or a manufacturer's logo is set on the terminal 1600, the fingerprint sensor 1614 may be integrated with the physical button or the manufacturer's logo.

The optical sensor 1615 is configured to collect ambient light intensity. In an embodiment, the processor 1601 may control the display brightness of the touch display screen 1605 according to the ambient light intensity collected by the optical sensor 1615. Specifically, when the ambient light intensity is high, the display brightness of the touch display screen 1605 is increased; and when the ambient light intensity is low, the display brightness of the touch display screen 1605 is decreased. In another embodiment, the processor 1601 may also dynamically adjust shooting parameters of the camera component 1606 according to the ambient light intensity collected by the optical sensor 1615.

The proximity sensor 1616 is also referred to as a distance sensor, and is generally disposed on the front panel of the terminal 1600. The proximity sensor 1616 is configured to collect a distance between the user and the front surface of the terminal 1600. In an embodiment, when the proximity sensor 1616 detects that the distance between the user and the front surface of the terminal 1600 gradually decreases, the processor 1601 controls the touch display screen 1605 to switch from a screen-on state to a screen-off state. When the proximity sensor 1616 detects that the distance between the user and the front surface of the terminal 1600 gradually increases, the processor 1601 controls the touch display screen 1605 to switch from a screen-off state to a screen-on state.

Persons skilled in the art may understand that the structure shown in FIG. 16 constitutes no limitation to the terminal 1600, and the terminal 1100 may include more or fewer components than those shown in the figure, or some components may be combined, or a different component deployment may be used.

In an exemplary embodiment, a non-transitory computer readable storage medium including an instruction is further provided. The storage medium is, for example, a memory including at least one instruction, at least one program, and a code set or an instruction set. The at least one instruction, the at least one program, and the code set or the instruction set may be executed by a processor to implement all or some steps of the method shown in any one of the embodiments shown in FIG. 1 or FIG. 3. For example, the non-temporary computer readable storage medium may be a ROM, a random access memory (RAM), CD-ROM, a magnetic tape, a floppy disk, or an optical data storage device.

After considering the specification and implementing the present disclosure, persons skilled in the art can readily think of other implementations of this application. This application is intended to cover any variation, use, or adaptive change of this application. These variations, uses, or adaptive changes follow the general principles of this application and include common general knowledge or common technical means in the art that are not disclosed in this application. The specification and the embodiments are considered as merely exemplary, and the real scope and spirit of this application are pointed out in the following claims.

It is to be understood that this application is not limited to the precise structures described above and shown in the accompanying drawings, and various modifications and changes can be made without departing from the scope of this application. The scope of this application is subject only to the appended claims.

What is claimed is:

1. An additional object display method, performed by a terminal, the method comprising:
   displaying a trigger control in a video playback interface, the video playback interface being used for playing a video comprising a plurality of picture frames;
   pausing playback of the video in response to an activation operation on the trigger control, and displaying a reference picture frame of the plurality of picture frames in the video playback interface, the reference picture frame being a picture frame corresponding to a pause time point in the video;
   displaying a preview picture of an additional object in the reference picture frame;
   displaying a switch control configured to cause display of a plurality of candidate additional objects within an additional object selection interface in response to an activation operation on the switch control;
   displaying a zoom control associated with the preview picture in the reference picture frame, wherein the trigger control, the zoom control, and the switch control are simultaneously displayed around the preview picture of the additional object;
in response to receiving a zoom operation on the zoom control, changing a display size of the additional object from an original display size to a new display size corresponding to the zoom operation;
obtaining a target object in response to a drag operation on the trigger control, the target object being a display object corresponding to an end position of the drag operation in the reference picture frame;
tracking the target object in a first set of picture frames of the plurality of pictures frames that are displayed after the reference picture frame and in a second set of picture frames of the plurality of picture frames that are displayed before the reference picture frame, wherein the tracking comprises:
tracking the target object in the first set of picture frames, frame-by-frame, in a chronological order starting from the reference picture frame corresponding to the pause time point; and
tracking the target object in the second set of picture frames, frame-by-frame, in a reverse order starting from the reference picture frame corresponding to the pause time point;
moving the preview picture of the additional object with the new display size from an initial position to a new position in the reference picture frame; and
displaying the additional object in each picture frame during the playback of the video.

2. The method according to claim 1, wherein the drag operation comprises a first drag operation, and wherein moving the preview picture of the additional object comprises:
moving the preview picture of the additional object in the video playback interface in response to a second drag operation on the preview picture of the additional object.

3. The method according to claim 1, wherein first display information comprises a display size of the target object in the each picture frame; the method further comprising:
calculating a zoom ratio of the additional object in the each picture frame according to the display size of the target object in the each picture frame and an original size of the target object, the original size of the target object being a display size of the target object in the reference picture frame;
obtaining the display size of the additional object in the each picture frame according to the new display size of the additional object and the zoom ratio; and
generating second display information comprising the display size of the additional object in the each picture frame.

4. The method according to claim 1, wherein first display information comprises a display position and a display posture of the target object in the each picture frame;
the method further comprising:
obtaining a display position and a display posture of the additional object in the each picture frame according to the display position and the display posture of the target object in the each picture frame and relative position information between the additional object and a target point; and
generating second display information comprising the display position and the display posture of the additional object in the each picture frame.

5. The method according to claim 1, wherein tracking the target object in the each picture frame of the video comprises:
tracking the target object in the each picture frame of the video by using a clustering of static-adaptive correspondences for deformable object tracking (CMT) algorithm.

6. The method according to claim 1, further comprising:
displaying, corresponding to the trigger control, the switch control in the video playback interface;
displaying the additional object selection interface in response to an activation operation on the switch control, the additional object selection interface comprising the plurality of candidate additional objects; and
obtaining, in response to a selection operation in the additional object selection interface, a candidate object corresponding to the selection operation as a new additional object corresponding to the trigger control.

7. The method according to claim 1, wherein the additional object is a static display object or a dynamic display object.

8. The method according to claim 1, further comprising:
in response to the tracking, obtaining first display information indicating at least one of a display position, a display size, or a display posture of the target object in each picture frame of the first set and the second set, wherein the first display information comprises pixel coordinates of a target point in the target object in the each picture frame, the target point being a position point corresponding to the end position of the drag operation on the trigger control in the reference picture frame;
obtaining relative position information between the additional object and the target point according to a display position of the preview picture of the additional object in the reference picture frame and the corresponding end position of the drag operation in the reference picture frame; and
generating second display information according to the first display information and the relative position information, the second display information indicating at least one of a display position, the display size, or a display posture of the additional object corresponding to the target object in the each picture frame.

9. An apparatus comprising:
a memory storing at least one instruction, at least one program, a code set, or an instruction set; and
a processor configured to execute the at least one instruction, the at least one program, the code set, or the instruction set, and upon execution, to:
control a display to display a trigger control in a video playback interface, the video playback interface being used for playing a video comprising a plurality of picture frames;
pause playback of the video in response to an activation operation on the trigger control;
control the display to display a preview picture of an additional object in the reference picture frame;
control the display to display a switch control configured to cause display of a plurality of candidate additional objects within an additional object selection interface in response to an activation operation on the switch control;
control the display to display a zoom control associated with the preview picture in the reference picture frame;

control the display to simultaneously display the trigger control, the zoom control, and the switch control around the preview picture of the additional object;
in response to receipt of a zoom operation on the zoom control, change a display size of the additional object from an original display size to a new display size corresponding to the zoom operation;
control the display to display a reference picture frame in the video playback interface, the reference picture frame being a picture frame corresponding to a pause time point in the video;
obtain a target object in response to a drag operation on the trigger control, the target object being a display object corresponding to an end position of the drag operation in the reference picture frame;
track the target object in a first set of picture frames of the plurality of pictures frames that are displayed after the reference picture frame and in a second set of picture frames of the plurality of picture frames that are displayed before the reference picture frame, wherein in order to track the target object, the processor is configured to:
  track the target object in the first set of picture frames, frame-by-frame, in a chronological order starting from the reference picture frame corresponding to the pause time point; and
  track the target object in the second set of picture frames, frame-by-frame, in a reverse order starting from the reference picture frame corresponding to the pause time point;
control the display to move the preview picture of the additional object with the new display size from an initial position to a new position in the reference picture frame; and
control the display to display the additional object in each picture frame during the playback of the video.

10. The apparatus according to claim 9, wherein first display information comprises a display size of the target object in the each picture frame, and
wherein the processor, upon the execution, is further configured to:
  calculate a zoom ratio of the additional object in the each picture frame according to the display size of the target object in the each picture frame and an original size of the target object, the original size of the target object being a display size of the target object in the reference picture frame;
  obtain the display size of the additional object in the each picture frame according to the new display size of the additional object and the zoom ratio; and
  generate second display information comprising the display size of the additional object in the each picture frame.

11. The apparatus according to claim 9, wherein first display information comprises a display position and a display posture of the target object in the each picture frame, and
wherein, the processor, upon the execution, is further configured to:
  obtain a display position and a display posture of the additional object in the each picture frame according to the display position and the display posture of the target object in the each picture frame and relative position information between the additional object and a target point; and
  generate second display information comprising the display position and the display posture of the additional object in the each picture frame.

12. The apparatus according to claim 9, wherein the processor is further configured to execute the at least one instruction, the at least one program, the code set, or the instruction set to drag the trigger control away from an initial position of the preview picture of the additional object without moving the preview picture.

13. The apparatus according to claim 9, wherein the processor is further configured to execute the at least one instruction, the at least one program, the code set, or the instruction set further to:
  in response to the tracking, obtain first display information indicating at least one of a display position, a display size, or a display posture of the target object in each picture frame of the first set and the second set, wherein the first display information comprises pixel coordinates of a target point in the target object in the each picture frame, the target point being a position point corresponding to the end position of the drag operation on the trigger control in the reference picture frame;
  obtain relative position information between the additional object and the target point according to a display position of the preview picture of the additional object in the reference picture frame and the corresponding end position of the drag operation in the reference picture frame; and
  generate second display information according to the first display information and the relative position information, the second display information indicating at least one of a display position, the display size, or a display posture of the additional object corresponding to the target object in the each picture frame.

14. A non-transitory computer readable storage medium storing at least one instruction, at least one program, a code set, or an instruction set, and the at least one instruction, the at least one program, the code set, or the instruction set configured to be loaded and executed by a processor, and upon being executed, cause the processor to:
  control a display to display a trigger control in a video playback interface, the video playback interface being used for playing a video comprising a plurality of picture frames;
  pause playback of the video in response to an activation operation on the trigger control;
  control the display to display a preview picture of an additional object in the reference picture frame;
  control the display to display a switch control configured to cause display of a plurality of candidate additional objects within an additional object selection interface in response to an activation operation on the switch control;
  control the display to display a zoom control associated with the preview picture in the reference picture frame;
  control the display to simultaneously display the trigger control, the zoom control, and the switch control around the preview picture of the additional object;
  in response to receipt of a zoom operation on the zoom control, change a display size of the additional object from an original display size to a new display size corresponding to the zoom operation;
  control the display to display a reference picture frame in the video playback interface, the reference picture frame being a picture frame corresponding to a pause time point in the video;

obtain a target object in response to a drag operation on the trigger control, the target object being a display object corresponding to an end position of the drag operation in the reference picture frame;

track the target object in a first set of picture frames of the plurality of pictures frames that are displayed after the reference picture frame and in a second set of picture frames of the plurality of picture frames that are displayed before the reference picture frame, wherein in order to track the target object, the at least one instruction, the at least one program, the code set, or the instruction set cause the processor to:

track the target object in the first set of picture frames, frame-by-frame, in a chronological order starting from the reference picture frame corresponding to the pause time point; and track the target object in the second set of picture frames, frame-by-frame, in a reverse order starting from the reference picture frame corresponding to the pause time point;

control the display to move the preview picture of the additional object with the new display size from an initial position to a new position in the reference picture frame; and control the display to display the additional object in each picture frame during the playback of the video.

15. The non-transitory computer readable storage medium according to claim 14, wherein first display information comprises a display size of the target object in the each picture frame, and wherein the at least one instruction, the at least one program, the code set, or the instruction set, is configured to, upon being executed, cause the processor to:

calculate a zoom ratio of the additional object in the each picture frame according to the display size of the target object in the each picture frame and an original size of the target object, the original size of the target object being a display size of the target object in the reference picture frame;

obtain the display size of the additional object in the each picture frame according to the new display size of the additional object and the zoom ratio; and generate second display information comprising the display size of the additional object in the each picture frame.

16. The non-transitory computer readable storage medium according to claim 14, wherein the at least one instruction, the at least one program, the code set, or the instruction set, is further configured to cause the processor, upon being executed, to drag the trigger control away from an initial position of the preview picture of the additional object without moving the preview picture.

17. The non-transitory computer readable storage medium according to claim 14, wherein the at least one instruction, the at least one program, the code set, or the instruction set, is further configured to cause the processor, upon being executed, to:

in response to the tracking, obtain first display information indicating at least one of a display position, a display size, or a display posture of the target object in each picture frame of the first set and the second set, wherein the first display information comprises pixel coordinates of a target point in the target object in the each picture frame, the target point being a position point corresponding to the end position of the drag operation on the trigger control in the reference picture frame;

obtain relative position information between the additional object and the target point according to a display position of the preview picture of the additional object in the reference picture frame and the corresponding end position of the drag operation in the reference picture frame;

generate second display information according to the first display information and the relative position information, the second display information indicating at least one of a display position, the display size, or a display posture of the additional object corresponding to the target object in the each picture frame.

\* \* \* \* \*